(12) United States Patent
Narasingarayanapeta et al.

(10) Patent No.: US 12,321,627 B2
(45) Date of Patent: *Jun. 3, 2025

(54) METHODS AND STORAGE NODES TO DECREASE DELAY IN RESUMING INPUT OUTPUT (I/O) OPERATIONS AFTER A NON-DISRUPTIVE EVENT FOR A STORAGE OBJECT OF A DISTRIBUTED STORAGE SYSTEM BY UTILIZING ASYNCHRONOUS INFLIGHT REPLAY OF THE I/O OPERATIONS

(71) Applicant: NetApp, Inc., San Jose, CA (US)

(72) Inventors: Krishna Murthy Chandraiah Setty Narasingarayanapeta, Bangalore (IN); Akhil Kaushik, Bangalore Karnataka (IN)

(73) Assignee: NetApp, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/424,244

(22) Filed: Jan. 26, 2024

(65) Prior Publication Data

US 2024/0168671 A1 May 23, 2024

Related U.S. Application Data

(63) Continuation of application No. 17/861,768, filed on Jul. 11, 2022, now Pat. No. 11,907,562.

(51) Int. Cl.
*G06F 3/06* (2006.01)
(52) U.S. Cl.
CPC .......... *G06F 3/0647* (2013.01); *G06F 3/0604* (2013.01); *G06F 3/0679* (2013.01)

(58) Field of Classification Search
CPC ..... G06F 3/0647; G06F 3/0604; G06F 3/0679
See application file for complete search history.

(56) References Cited

U.S. PATENT DOCUMENTS 5,742,792 A   4/1998  Yanai et al.
6,163,856 A  12/2000  Dion et al.
(Continued)

OTHER PUBLICATIONS

Corrected Notice of Allowance mailed on Nov. 8, 2023 for U.S. Appl. No. 18/158,957, filed Jan. 24, 2023, 2 pages.
(Continued)

*Primary Examiner* — Gurtej Bansal
(74) *Attorney, Agent, or Firm* — Jaffery Watson Hamilton & DeSanctis LLP

(57) ABSTRACT

In one embodiment, a method comprises maintaining state information regarding a data replication status for a storage object of the storage node of a primary storage cluster with the storage object being replicated to a replicated storage object of a secondary storage cluster, temporarily disallowing input/output (I/O) operations when the storage object has a connection loss or failure. The method further includes initiating a resynchronization between the storage object and the replicated storage object including initiating asynchronous persistent inflight tracking and replay of any missing I/O operations that are missing from one of a first Op log of the primary storage cluster and a second Op log of the secondary storage cluster, and allowing new I/O operations to be handled with the storage object of the primary storage cluster without waiting for completion of the asynchronous persistent inflight tracking and replay at the secondary storage cluster.

20 Claims, 15 Drawing Sheets

(56) References Cited

U.S. PATENT DOCUMENTS

| | | |
|---|---|---|
| 6,389,551 B1 | 5/2002 | Yount |
| 6,415,372 B1 | 7/2002 | Zakai et al. |
| 6,732,124 B1 | 5/2004 | Koseki et al. |
| 7,039,827 B2 | 5/2006 | Meyer et al. |
| 7,475,204 B2 | 1/2009 | Buah et al. |
| 7,500,014 B1 | 3/2009 | Jacobson et al. |
| 7,631,066 B1 | 12/2009 | Schatz et al. |
| 7,640,451 B2 | 12/2009 | Meyer et al. |
| 7,890,626 B1 | 2/2011 | Gadir |
| 8,335,761 B1 | 12/2012 | Natanzon |
| 8,498,967 B1 | 7/2013 | Chatterjee et al. |
| 8,645,623 B1 | 2/2014 | O'Shea et al. |
| 8,856,583 B1 | 10/2014 | Visser et al. |
| 8,874,960 B1 | 10/2014 | Khan et al. |
| 9,189,341 B1 | 11/2015 | Natanzon et al. |
| 9,875,042 B1 | 1/2018 | Natanzon et al. |
| 10,412,066 B1 | 9/2019 | Vemuri |
| 10,489,230 B1 | 11/2019 | Chen et al. |
| 10,496,320 B2 | 12/2019 | Eisler et al. |
| 10,725,691 B1 | 7/2020 | Kaushik et al. |
| 10,761,768 B1 | 9/2020 | Kaushik et al. |
| 11,036,423 B2 | 6/2021 | Kaushik et al. |
| 11,089,105 B1 | 8/2021 | Karumbunathan et al. |
| 11,327,857 B2 | 5/2022 | Bhargava et al. |
| 11,360,867 B1 | 6/2022 | Subramanian et al. |
| 11,409,622 B1 | 8/2022 | Kaushik et al. |
| 11,481,139 B1 | 10/2022 | Vijayan et al. |
| 11,537,314 B1 | 12/2022 | Subramanian et al. |
| 11,593,016 B2 | 2/2023 | Kaushik et al. |
| 11,853,589 B2 | 12/2023 | Narasingarayanapeta |
| 11,893,261 B2 | 2/2024 | Narasingarayanapeta |
| 11,907,562 B2 | 2/2024 | Narasingarayanapeta |
| 11,928,352 B2 | 3/2024 | Narasingarayanapeta |
| 2002/0132613 A1 | 9/2002 | Leung et al. |
| 2004/0153719 A1 | 8/2004 | Achiwa et al. |
| 2004/0267809 A1 | 12/2004 | East et al. |
| 2005/0229034 A1 | 10/2005 | Fujibayashi |
| 2005/0270855 A1 | 12/2005 | Earhart et al. |
| 2006/0095478 A1 | 5/2006 | Cherkauer et al. |
| 2006/0136354 A1 | 6/2006 | Bell et al. |
| 2006/0236048 A1 | 10/2006 | Deguchi et al. |
| 2007/0016754 A1 | 1/2007 | Testardi |
| 2007/0180307 A1 | 8/2007 | Zohar et al. |
| 2007/0234006 A1 | 10/2007 | Radulescu et al. |
| 2008/0201702 A1 | 8/2008 | Bunn |
| 2009/0043979 A1 | 2/2009 | Jarvis |
| 2009/0070528 A1 | 3/2009 | Bartfai et al. |
| 2009/0089609 A1 | 4/2009 | Baba |
| 2009/0307530 A1 | 12/2009 | Tarta |
| 2010/0064168 A1 | 3/2010 | Smoot et al. |
| 2010/0082962 A1 | 4/2010 | Srinivasan et al. |
| 2010/0161554 A1 | 6/2010 | Datuashvili et al. |
| 2011/0106855 A1 | 5/2011 | Resch et al. |
| 2011/0314148 A1 | 12/2011 | Petersen et al. |
| 2012/0151249 A1 | 6/2012 | Swan et al. |
| 2013/0159620 A1 | 6/2013 | Sakashita et al. |
| 2013/0254590 A1 | 9/2013 | Chercoles Sanchez et al. |
| 2014/0298136 A1 | 10/2014 | Resch et al. |
| 2015/0006949 A1 | 1/2015 | Bittles et al. |
| 2015/0058838 A1 | 2/2015 | Tsirkin |
| 2015/0169414 A1 | 6/2015 | Lalsangi et al. |
| 2016/0077917 A1 | 3/2016 | Battepati et al. |
| 2016/0110378 A1* | 4/2016 | Mu ................. G06F 11/00 707/634 |
| 2016/0366226 A1 | 12/2016 | Friedman et al. |
| 2017/0093983 A1 | 3/2017 | Everhart et al. |
| 2018/0246658 A1* | 8/2018 | Bretschneider ......... G06F 3/065 |
| 2018/0260125 A1 | 9/2018 | Botes et al. |
| 2018/0352032 A1 | 12/2018 | Liu et al. |
| 2019/0004908 A1 | 1/2019 | Gopinath et al. |
| 2019/0034286 A1 | 1/2019 | Brown et al. |
| 2019/0212924 A1 | 7/2019 | Ward et al. |
| 2019/0229978 A1 | 7/2019 | Rajvaidya et al. |
| 2019/0347352 A1 | 11/2019 | Gochkov et al. |
| 2019/0394266 A1 | 12/2019 | Fukuyama et al. |
| 2020/0027898 A1 | 1/2020 | Paul et al. |
| 2020/0034258 A1 | 1/2020 | Avraham et al. |
| 2020/0035627 A1 | 1/2020 | Iguchi et al. |
| 2020/0050495 A1 | 2/2020 | Voutilainen et al. |
| 2020/0050587 A1 | 2/2020 | Kaushik et al. |
| 2020/0081801 A1 | 3/2020 | Brown et al. |
| 2020/0125460 A1 | 4/2020 | Selvaraj et al. |
| 2020/0133520 A1 | 4/2020 | Patnaik et al. |
| 2020/0137157 A1 | 4/2020 | Joseph et al. |
| 2020/0250151 A1 | 8/2020 | Yin et al. |
| 2020/0250171 A1 | 8/2020 | Yin et al. |
| 2020/0273984 A1 | 8/2020 | Nakano et al. |
| 2020/0278984 A1 | 9/2020 | Kaushik et al. |
| 2020/0301787 A1 | 9/2020 | Cabral et al. |
| 2020/0319982 A1 | 10/2020 | Rusev et al. |
| 2021/0165573 A1 | 6/2021 | Demoor et al. |
| 2021/0303165 A1 | 9/2021 | Kaushik et al. |
| 2021/0374157 A1 | 12/2021 | Reddy et al. |
| 2022/0019350 A1 | 1/2022 | Karr |
| 2022/0121533 A1 | 4/2022 | Kumar et al. |
| 2022/0374321 A1 | 11/2022 | Kaushik et al. |
| 2023/0110776 A1 | 4/2023 | Subramanian et al. |
| 2023/0121272 A1 | 4/2023 | Subramanian et al. |
| 2023/0168834 A1 | 6/2023 | Narasingarayanapeta |
| 2024/0160374 A1 | 5/2024 | Narasingarayanapeta |

OTHER PUBLICATIONS

Final Office Action mailed May 20, 2024 for U.S. Appl. No. 18/158,947, filed Jan. 24, 2023, 13 pages.
Non-Final Office Action mailed on Feb. 1, 2024 for U.S. Appl. No. 18/158,947, filed Jan. 24, 2023, 11 pages.
Non-Final Office Action mailed on Feb. 17, 2023 for U.S. Appl. No. 17/510,795, filed Oct. 26, 2021, 11 pages.
Notice of Allowance mailed Aug. 14, 2023 for U.S. Appl. No. 18/158,957, filed Jan. 24, 2023, 08 pages.
Notice of Allowance mailed Dec. 13, 2022 for U.S. Appl. No. 17/219,815, filed Mar. 31, 2021.
Notice of Allowance mailed Jun. 28, 2023 for U.S. Appl. No. 18/158,947, filed Jan. 24, 2023, 8 pages.
Notice of Allowance mailed Nov. 2, 2022 for U.S. Appl. No. 17/495,990, filed Oct. 7, 2021, 8 pages.
Notice of Allowance mailed Nov. 18, 2022 for U.S. Appl. No. 17/219,812, filed Mar. 31, 2021, 12 pages.
Notice of Allowance mailed Oct. 31, 2022 for U.S. Appl. No. 17/219,812, filed Mar. 31, 2021, 9 pages.
Notice of Allowance mailed on Aug. 5, 2024 for U.S. Appl. No. 18/158,947, filed Jan. 24, 2023, 08 pages.
Notice of Allowance mailed on Feb. 8, 2024 for U.S. Appl. No. 17/510,795, filed Oct. 26, 2021, 02 pages.
Notice of Allowance mailed on Jan. 2, 2024 for U.S. Appl. No. 17/510,788, filed Oct. 26, 2021, 02 pages.
Notice of Allowance mailed on Jan. 19, 2024 for U.S. Appl. No. 17/861,768, filed Jul. 11, 2022, 03 pages.
Notice of Allowance mailed on Jul. 7, 2023 for U.S. Appl. No. 17/510,795, filed Oct. 26, 2021, 08 pages.
Notice of Allowance mailed on Jul. 26, 2023 for U.S. Appl. No. 17/510,795, filed Oct. 26, 2021, 3 pages.
Notice of Allowance mailed on Jun. 14, 2023 for U.S. Appl. No. 17/505,962, filed Oct. 20, 2021, 8 pages.
Notice of Allowance mailed on Jun. 20, 2023 for U.S. Appl. No. 17/510,788, filed Oct. 26, 2021, 7 pages.
Notice of Allowance mailed on Nov. 17, 2023 for U.S. Appl. No. 18/158,957, filed Jan. 24, 2023, 2 pages.
Notice of Allowance mailed on Oct. 6, 2023 for U.S. Appl. No. 17/861,768, filed Jul. 11, 2022, 09 pages.
Notice of Allowance mailed on Oct. 12, 2023 for U.S. Appl. No. 17/510,795, filed Oct. 26, 2021, 7 pages.
Notice of Allowance mailed on Oct. 19, 2023 for U.S. Appl. No. 17/861,768, filed Jul. 11, 2022, 2 pages.
Notice of Allowance mailed on Oct. 19, 2023 for U.S. Appl. No. 18/158,947, filed Jan. 24, 2023, 8 pages.
Notice of Allowance mailed on Oct. 25, 2023 for U.S. Appl. No. 17/510,795, filed Oct. 26, 2021, 2 pages.

(56) References Cited

OTHER PUBLICATIONS

Notice of Allowance mailed on Sep. 28, 2023 for U.S. Appl. No. 17/510,788, filed Oct. 26, 2021, 07 pages.
Pan L, "Paxos at Its Heart is Very Simple," Distributed System, 2018, Retrieved From : URL: https://blog.the-pans.com/paxos-explained/, pp. 1-12.
U.S. Non-Final Office action dated Dec. 21, 2021 in U.S. Appl. No. 17/238,829, filed Apr. 23, 2021, 20 pages.
U.S. Notice of Allowance dated Apr. 6, 2022 in U.S. Appl. No. 17/238,829, filed Apr. 23, 2021, 9 pages.
U.S. Notice of Allowance mailed Jun. 24, 2022 in U.S. Appl. No. 17/219,816, filed Mar. 31, 2021, 8 pages.
U.S. Notice of Allowance mailed May 6, 2022 in U.S. Appl. No. 17/219,746, filed Mar. 31, 2021, 18 pages.
U.S. Notice of Allowance mailed Oct. 26, 2022 in U.S. Appl. No. 17/219,812, filed Mar. 31, 2021, 9 pages.
Non-Final Office Action mailed on Dec. 6, 2024 for U.S. Appl. No. 18/421,649, filed Jan. 24, 2024, 06 pages.

\* cited by examiner

METHODS AND STORAGE NODES TO DECREASE DELAY IN RESUMING INPUT OUTPUT (I/O) OPERATIONS AFTER A NON-DISRUPTIVE EVENT FOR A STORAGE OBJECT OF A DISTRIBUTED STORAGE SYSTEM BY UTILIZING ASYNCHRONOUS INFLIGHT REPLAY OF THE I/O OPERATIONS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2021, NetApp, Inc.

CROSS-REFERENCE TO RELATED APPLICATIONS

This application is a continuation of U.S. patent application Ser. No. 17/861,768, filed Jul. 11, 2022, the contents of which are hereby incorporated by reference in their entirety for all purposes.

FIELD

Various embodiments of the present disclosure generally relate to multi-site distributed data storage systems. In particular, some embodiments relate to methods to decrease delay of resuming input/output (I/O) operations after a non-disruptive event for a storage object of a storage node of a primary or secondary storage cluster of a cross-site distributed storage system (e.g., cross-site high-availability (HA) storage solutions).

BACKGROUND

Multiple storage nodes organized as a cluster may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives (HDDs), solid state drives (SSDs), flash memory systems, or other storage devices. The storage nodes may logically organize the data stored on the devices as volumes accessible as logical units. Each volume may be implemented as a set of data structures, such as data blocks that store data for the volume and metadata blocks that describe the data of the volume.

Business enterprises rely on multiple clusters for storing and retrieving data. Each cluster may be a separate data center with the clusters able to communicate over an unreliable network. The network can be prone to failures leading to connectivity issues such as transient or persistent connectivity issues that disrupt operations of a business enterprise.

SUMMARY

Storage nodes and methods are described to decrease delay of resuming input/output (I/O) operations after a non-disruptive event for a storage object of a storage node of a primary or secondary storage cluster of a cross-site distributed storage system (e.g., cross-site high-availability (HA) storage solutions) by utilizing asynchronous persistent inflight tracking of the I/O operations (Ops). According to one embodiment, a method performed by one or more processing resources of a distributed storage system comprises maintaining state information regarding a data replication status for a storage object of the storage node of a primary storage cluster with the storage object being replicated to a replicated storage object of a secondary storage cluster, temporarily disallowing input/output (I/O) operations for the storage object when the storage object of the primary storage cluster has a connection loss or failure, which causes an out of sync state for the storage object of the primary storage cluster. The method further includes initiating a resynchronization between the storage object and the replicated storage object based on the OOS state with the resynchronization including initiating asynchronous inflight tracking and replay (also referred to as "asynchronous inflight replay") of any missing I/O operations that are missing from one of a first Op log of the primary storage cluster and a second Op log of the secondary storage cluster, and allowing new I/O operations to be handled with the storage object of the primary storage cluster without waiting for completion of the asynchronous persistent inflight tracking and replay at the secondary storage cluster.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
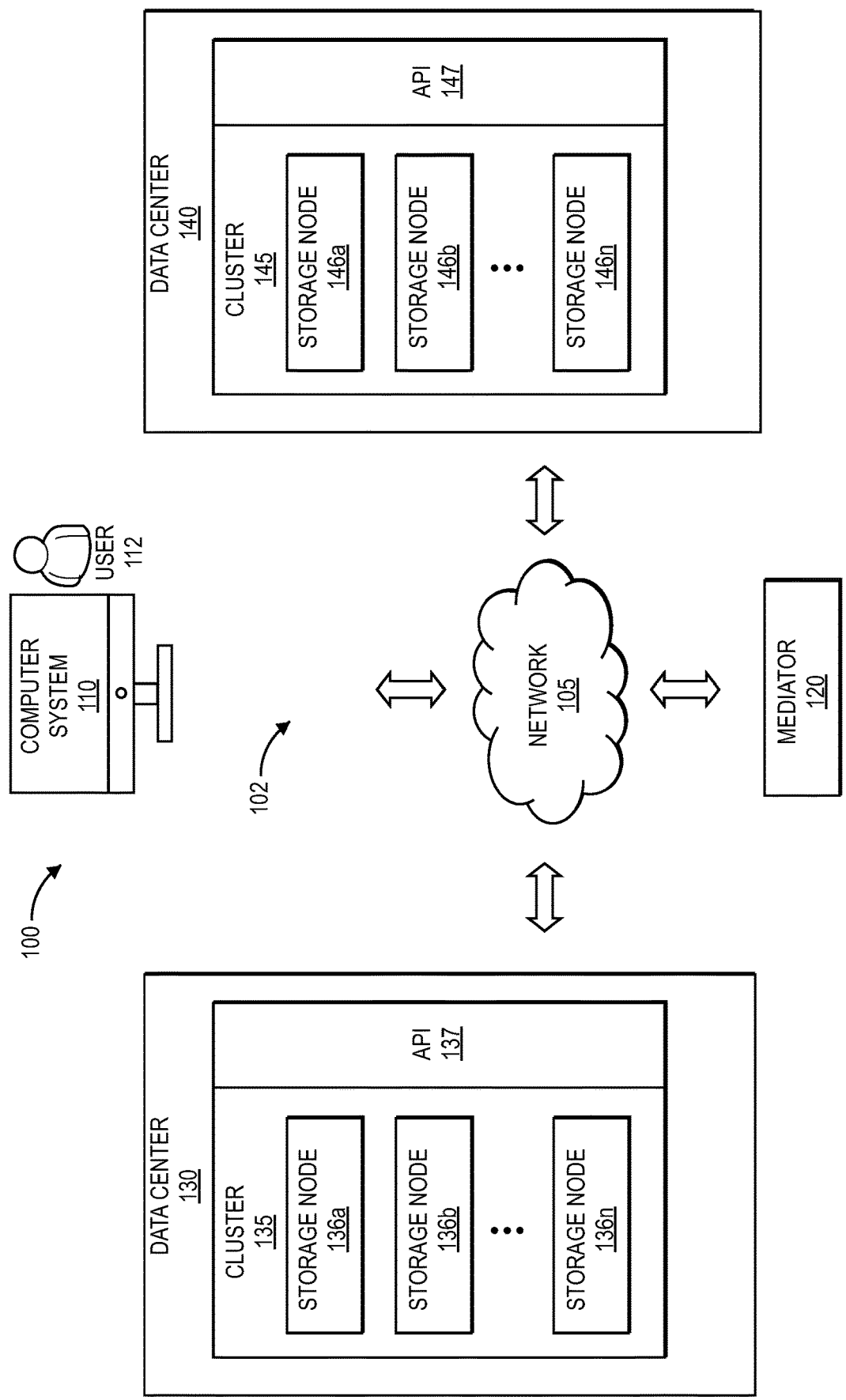
FIG. 1 is a block diagram illustrating an environment in which various embodiments may be implemented.

Systems and methods are described for decreasing delay of resuming I/O operations after a failure or loss of connectivity of a storage object (e.g., loss of synchronous data replication relationship between a first storage object of a primary storage cluster and a second storage object of a secondary storage cluster) within a cross-site distributed storage system based on asynchronous inflight replay of operations on primary and secondary storage clusters of the storage system. In the context of cross-site distributed storage system (including cross-site HA storage solutions that perform synchronous data replication to support zero RPO protection), a certain degree of consistency over time is maintained between a mirror copy and a primary dataset depending upon the particular implementation.

In one embodiment, the delay or pause in processing of user I/O Ops can be reduced with asynchronous persistent inflight tracking replay (IFT-P) between an Op log (or Op log file) of the primary storage cluster and an Op log (or Op log file) of the secondary storage cluster. The persistent inflight tracking replay processes all pending I/O Ops based on an order of IFT-P sequence number. The Ops being replayed (e.g., executed again such as part of a replication operation or as part of flushing content from a cache having the Op log to persistent storage) are subject to a dependent graph manager (DGM) and overlap write manager (OWM) checks. Once IFT-P replay has processed all Ops, the data structures of the DGM and OWM at the primary storage cluster are fully ready with information of inflight Ops, Ops completed at the secondary storage cluster, and Ops suspended at the primary storage cluster (e.g., Ops suspended due to waiting for dependencies between Ops to be satisfied). Therefore, user I/O can be allowed on the primary storage cluster just after IFT-P processes all Ops without waiting for the IFT-P replay Ops to complete at the secondary storage cluster.

In one example, a primary and a secondary storage cluster are diverged due to inflight I/O operations (Ops) that are not yet acknowledged to a client device. An inflight op is an op that is in progress on either primary or secondary storage cluster and its response is held by a synchronous replication circuitry (SR circuitry), which includes a splitter component (or replicating circuitry). An inflight Op can be a data Op (e.g., write, punch hole, etc.) or a metadata op (e.g., create, unlink, set attribute, etc.). An inflight Op can have the following states:

request received: Op is received by splitter component
primary sent: Op is in progress with file system of SR circuitry of primary storage cluster
primary done: Op completed by file system of primary storage cluster and splitter component callback has been called.
secondary sent: Op is dispatched to secondary storage cluster and is either in transit (network) or in progress by file system of SR circuitry of secondary storage cluster.
secondary done: Op completed by file system of secondary storage cluster and splitter component has received a completion callback.
response sent: Op completed on both of primary and secondary storage cluster and a response is released by splitter component of SR circuitry.

A splitter component can include one or more queues to store incoming operations and a splitter object (e.g., replication circuitry) that is configured to split (replicate) operations targeting a storage object. The splitter object replicates the operations to a replicated storage object of the second storage cluster. Operations that been acknowledged to the client device have been executed by a storage cluster and hence committed on both primary and secondary endpoints for the primary and secondary storage clusters. However, at a given instance of time, one or more Ops could be inflight i.e., executed on neither of endpoints (e.g., first storage object hosted by primary storage cluster, replicated second storage object hosted by secondary storage cluster), both of the endpoints, or executed on one of the endpoints. As a consequence, the primary and second storage clusters at a given point in time could be divergent with respect to inflight Ops. A common snapshot may be performed periodically to serve as resynchronization points.

Embodiments described herein seek to improve various technological processes associated with cross-site storage solutions and ensure the process of quickly resuming handling of I/O Ops receiving by a primary storage cluster or a secondary storage cluster. Various embodiments of the present technology provide for a wide range of technical effects, advantages, and/or improvements to stretched storage systems and participating distributed storage systems. For example, various embodiments may include one or more of the following technical effects, advantages, and/or improvements: (i) maintaining zero RPO during a failure or loss of connectivity of a storage object while reducing the user I/O pause duration based on asynchronous persistent inflight tracking replay (IFT-P) between an Op log of the primary storage cluster and an Op log of the secondary storage cluster, and/or (ii) storing entire Op log for inflight tracking replay in non-volatile memory of a storage node of a storage cluster to provide a reduced IFT-P replay duration and thus reduce the user I/O pause duration.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Example Operating Environment

FIG. 1 is a block diagram illustrating an environment 100 in which various embodiments may be implemented. In various examples described herein, an administrator (e.g., user 112) of a multi-site distributed storage system 102 having clusters 135 and cluster 145 or a managed service provider responsible for multiple distributed storage systems of the same or multiple customers may monitor various operations and network conditions of the distributed storage system or multiple distributed storage systems via a browser-based interface presented on computer system 110.

In the context of the present example, the multi-site distributed storage system 102 includes a data center 130, a data center 140, and optionally a mediator 120. The data centers 130 and 140, the mediator 120, and the computer system 110 are coupled in communication via a network 105, which, depending upon the particular implementation, may be a Local Area Network (LAN), a Wide Area Network (WAN), or the Internet.

The data centers 130 and 140 may represent an enterprise data center (e.g., an on-premises customer data center) that is owned and operated by a company or the data center 130 may be managed by a third party (or a managed service provider) on behalf of the company, which may lease the equipment and infrastructure. Alternatively, the data centers 130 and 140 may represent a colocation data center in which a company rents space of a facility owned by others and located off the company premises. The data centers are shown with a cluster (e.g., cluster 135, cluster 145). Those of ordinary skill in the art will appreciate additional IT infrastructure may be included within the data centers 130 and 140. In one example, the data center 140 is a mirrored copy of the data center 130 to provide non-disruptive operations at all times even in the presence of failures including, but not limited to, network disconnection between the data centers 130 and 140 and the mediator 120, which can also be located at a data center.

Turning now to the cluster 135, it includes multiple storage nodes 136a-n and an Application Programming Interface (API) 137. In the context of the present example, the multiple storage nodes 136a-n are organized as a cluster and provide a distributed storage architecture to service storage requests issued by one or more clients (not shown) of the cluster. The data served by the storage nodes 136a-n may be distributed across multiple storage units embodied as persistent storage devices, including but not limited to HDDs, SSDs, flash memory systems, or other storage devices. In a similar manner, cluster 145 includes multiple storage nodes 146a-n and an Application Programming Interface (API) 147. In the context of the present example, the multiple storage nodes 146a-n are organized as a cluster and provide a distributed storage architecture to service storage requests issued by one or more clients of the cluster.

The API 137 may provide an interface through which the cluster 135 is configured and/or queried by external actors (e.g., the computer system 110, data center 140, the mediator 120, clients). Depending upon the particular implementation, the API 137 may represent a Representational State Transfer (REST)ful API that uses Hypertext Transfer Protocol (HTTP) methods (e.g., GET, POST, PATCH, DELETE, and OPTIONS) to indicate its actions. Depending upon the particular embodiment, the API 137 may provide access to various telemetry data (e.g., performance, configuration, storage efficiency metrics, and other system data) relating to the cluster 135 or components thereof. As those skilled in the art will appreciate various other types of telemetry data may be made available via the API 137, including, but not limited to measures of latency, utilization, and/or performance at various levels (e.g., the cluster level, the storage node level, or the storage node component level).

In the context of the present example, the mediator 120, which may represent a private or public cloud accessible (e.g., via a web portal) to an administrator associated with a managed service provider and/or administrators of one or more customers of the managed service provider, includes a cloud-based, monitoring system.

While for sake of brevity, only two data centers are shown in the context of the present example, it is to be appreciated that additional clusters owned by or leased by the same or different companies (data storage subscribers/customers) may be monitored and one or more metrics may be estimated based on data stored within a given level of a data store in accordance with the methodologies described herein and such clusters may reside in multiple data centers of different types (e.g., enterprise data centers, managed services data centers, or colocation data centers).

Figure 2:
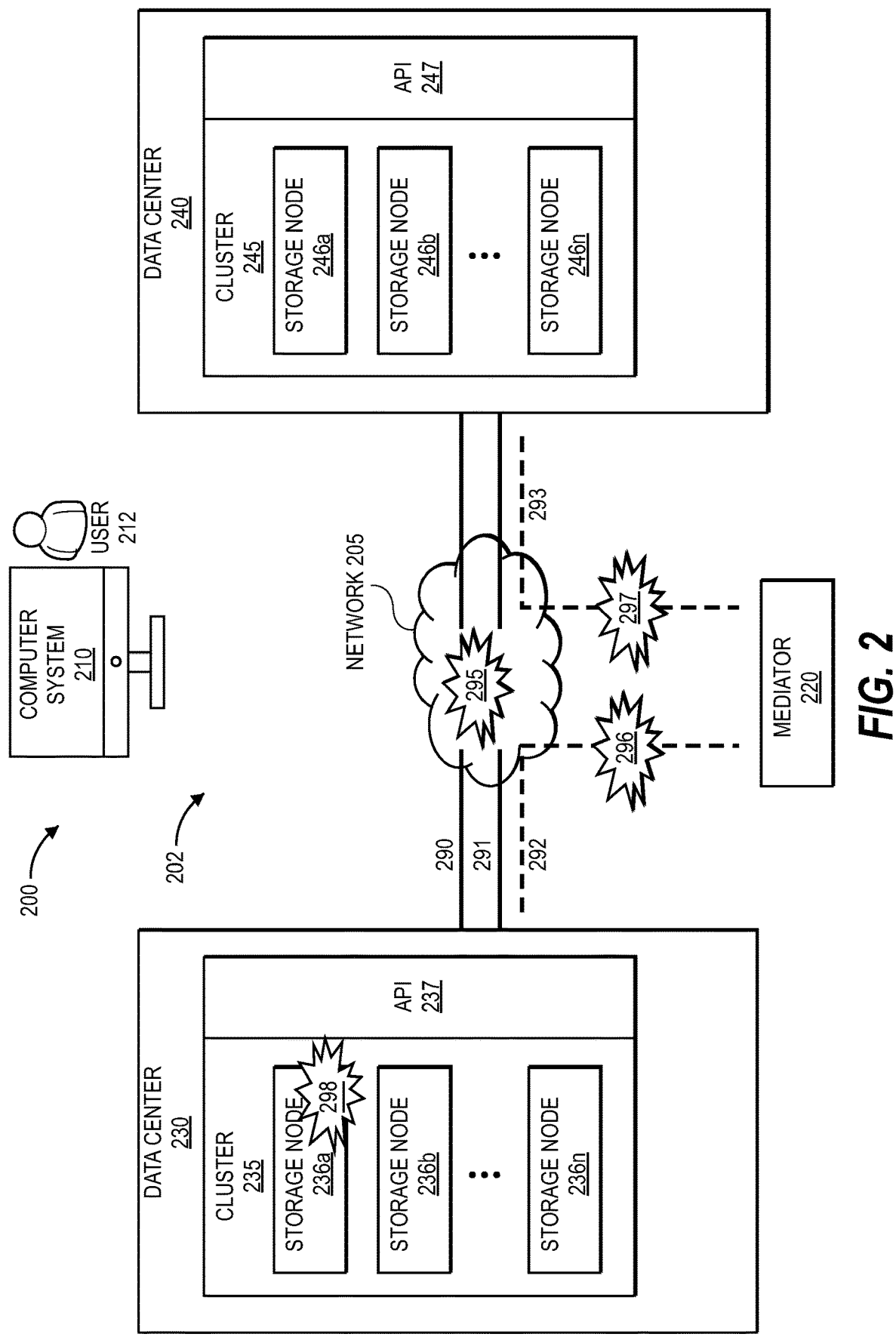
FIG. 2 is a block diagram illustrating an environment having potential failures within a multi-site distributed storage system in which various embodiments may be implemented.

FIG. 2 is a block diagram illustrating an environment 200 having potential failures within a multi-site distributed storage system 202 in which various embodiments may be implemented. In various examples described herein, an administrator (e.g., user 212) of a multi-site distributed storage system 202 having clusters 235 and cluster 245 or a managed service provider responsible for multiple distributed storage systems of the same or multiple customers may monitor various operations and network conditions of the distributed storage system or multiple distributed storage systems via a browser-based interface presented on computer system 210.

In the context of the present example, the system 202 includes data center 230, data center 240, and optionally a mediator 220. The data centers 230 and 240, the mediator 220, and the computer system 210 are coupled in communication via a network 205, which, depending upon the particular implementation, may be a Local Area Network (LAN), a Wide Area Network (WAN), or the Internet.

The data centers 230 and 240 may represent an enterprise data center (e.g., an on-premises customer data center) that is owned and operated by a company or the data center 230 may be managed by a third party (or a managed service provider) on behalf of the company, which may lease the equipment and infrastructure. Alternatively, the data centers 230 and 240 may represent a colocation data center in which a company rents space of a facility owned by others and located off the company premises. The data centers are shown with a cluster (e.g., cluster 235, cluster 245). Those of ordinary skill in the art will appreciate additional IT infrastructure may be included within the data centers 230 and 240. In one example, the data center 240 is a mirrored copy of the data center 230 to provide non-disruptive operations at all times even in the presence of failures including, but not limited to, a failure 298 of storage node 236a, network disconnection between the data centers 230 and 240 and the mediator 220, which can also be a data center.

The system 202 can utilize communications 290 and 291 to synchronize a mirrored copy of data of the data center 240 with a primary copy of the data of the data center 230. Either of the communications 290 and 291 between the data centers 230 and 240 may have a failure 295. In a similar manner, a communication 292 between data center 230 and mediator 220 may have a failure 296 while a communication 293 between the data center 240 and the mediator 220 may have a failure 297. If not responded to appropriately, these failures whether transient or permanent have the potential to disrupt operations for users of the distributed storage system 202. In one example, communications between the data centers 230 and 240 have approximately a 5-20 millisecond round trip time.

Turning now to the cluster 235, it includes at least two storage nodes 236a-b, optionally includes additional storage nodes (e.g., 236n) and an Application Programming Interface (API) 237. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

Turning now to the cluster 245, it includes at least two storage nodes 246a-b, optionally includes additional storage nodes (e.g., 246n) and includes an Application Programming Interface (API) 247. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

In one example, each cluster can have up to 5 CGs with each CG having up to 12 volumes. The system 202 provides a planned failover feature at a CG granularity. The planned failover feature allows switching storage access from a primary copy of the data center 230 to a mirror copy of the data center 240 or vice versa.

Figure 3:
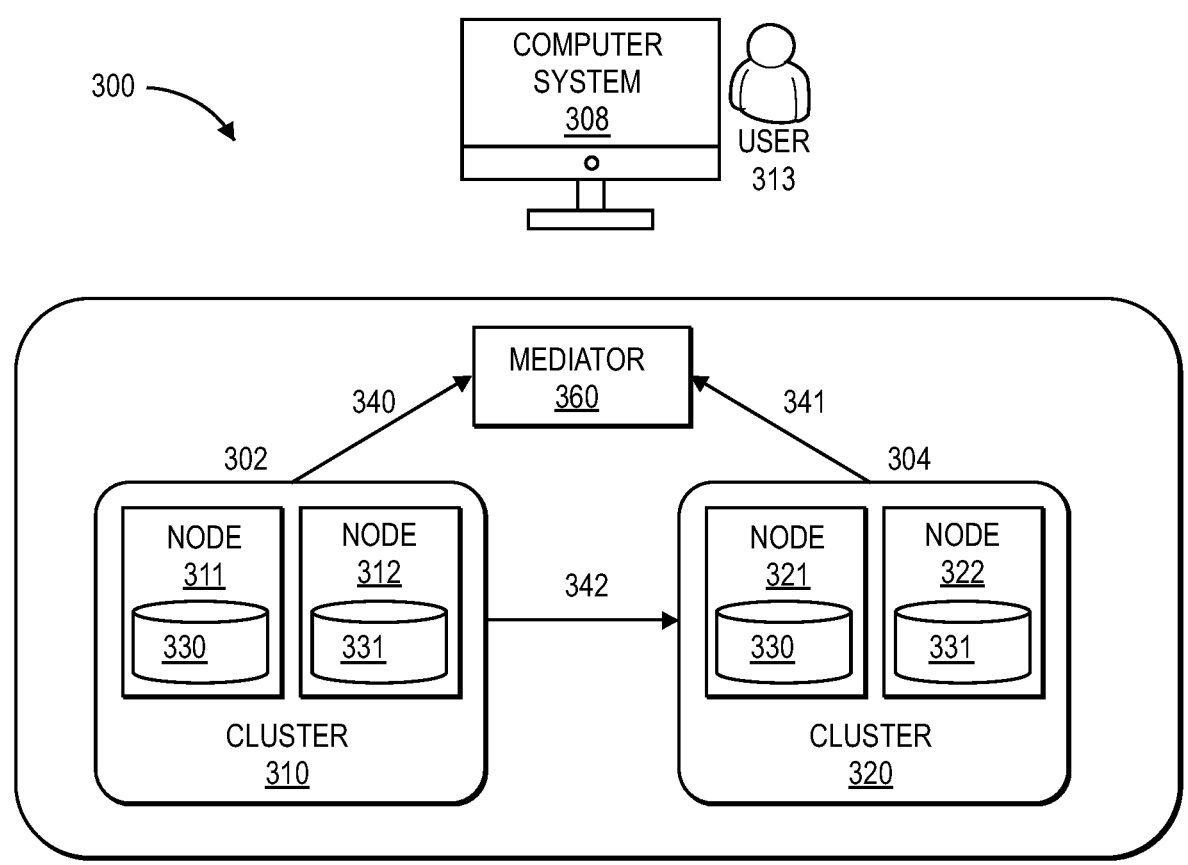
FIG. 3 is a block diagram of a multi-site distributed storage system according to various embodiments of the present disclosure.

FIG. 3 is a block diagram illustrating a multi-site distributed storage system 300 in which various embodiments may be implemented. In various examples described herein, an administrator (e.g., user 313) of the multi-site distributed storage system 300 or a managed service provider responsible for multiple distributed storage systems of the same or multiple customers may monitor various operations and network conditions of the distributed storage system or multiple distributed storage systems via a browser-based interface presented on computer system 308. In the context of the present example, the distributed storage system 300 includes a data center 302 having a cluster 310, a data center 304 having a cluster 320, and a mediator 360. The clusters 310, 320, and the mediator 360 are coupled in communication (e.g., communications 340-342) via a network, which, depending upon the particular implementation, may be a Local Area Network (LAN), a Wide Area Network (WAN), or the Internet. The communications 340-342 provide redundance communication channels for operations of the distributed storage system 300 (e.g., liveliness operation, consensus operation)

The cluster 310 includes nodes 311 and 312 while the cluster 320 includes nodes 321 and 322. In one example, the cluster 320 has a data copy 330 in node 321 that is a mirrored copy of data copy 330 in node 311. A data copy 331 in node 322 is a mirrored copy of the data copy 331 in node 312 to provide non-disruptive operations at all times even in the presence of failures including, but not limited to, network disconnection between the data centers 302 and 304 and the mediator 360.

The multi-site distributed storage system 300 provides correctness of data, availability, and redundancy of data. In one example, the nodes 311 and 312 are designated as a leader and the nodes 321 and 322 are designated as a follower. The leader is given preference to serve I/O commands to requesting clients and this allows the leader to obtain a consensus in a case of a race between the clusters 310 and 320. The mediator 360 enables an automated unplanned failover (AUFO) in the event of a failure. The data copy 330 (leader), data copy 331 (follower), and the mediator 360 form a three way quorum. If two of the three entities reach an agreement for whether the leader or follower should serve I/O commands to requesting clients, then this forms a strong consensus.

In one embodiment, node 311 has a failure and the data copy 331 for a storage object of node 312 remains in sync. The node 312 handles a takeover operation for data copy 330 (leader). Upon a volume mount time, the node 311 temporarily disallows input/output operations (e.g., both read and write) with a retriable error. The I/O operations from a computer system 308 are not allowed at node 311 until resynchronization occurs or a timeout occurs.

Next, the cluster 320 performs an automatic Fast Resynchronization (Fast Resync) to maintain zero recovery point objective (RPO) protection. The Fast Resync is based on reestablishing a Sync Data Path between data copy 330

(leader) of node 311 and data copy 330 (follower) of mirrored node 321, and reconciling inflight regions based on persistent inflight tracking of I/O operations (IFT-P). The secondary storage cluster 320 can be provided with necessary information about a high availability partner to avoid cross-cluster calls between the primary and secondary storage cluster. The Fast Resync establishes a transfer engine session and starts persistent inflight op tracking replay. A Fast Resync can be triggered as soon a storage object on the secondary storage cluster is mounted.

Subsequently, node 311 waits for Ops to be dispatched from the primary storage cluster and will be ready for I/O prior to completion of the persistent inflight op tracking replay on the secondary storage cluster.

Figure 6A:
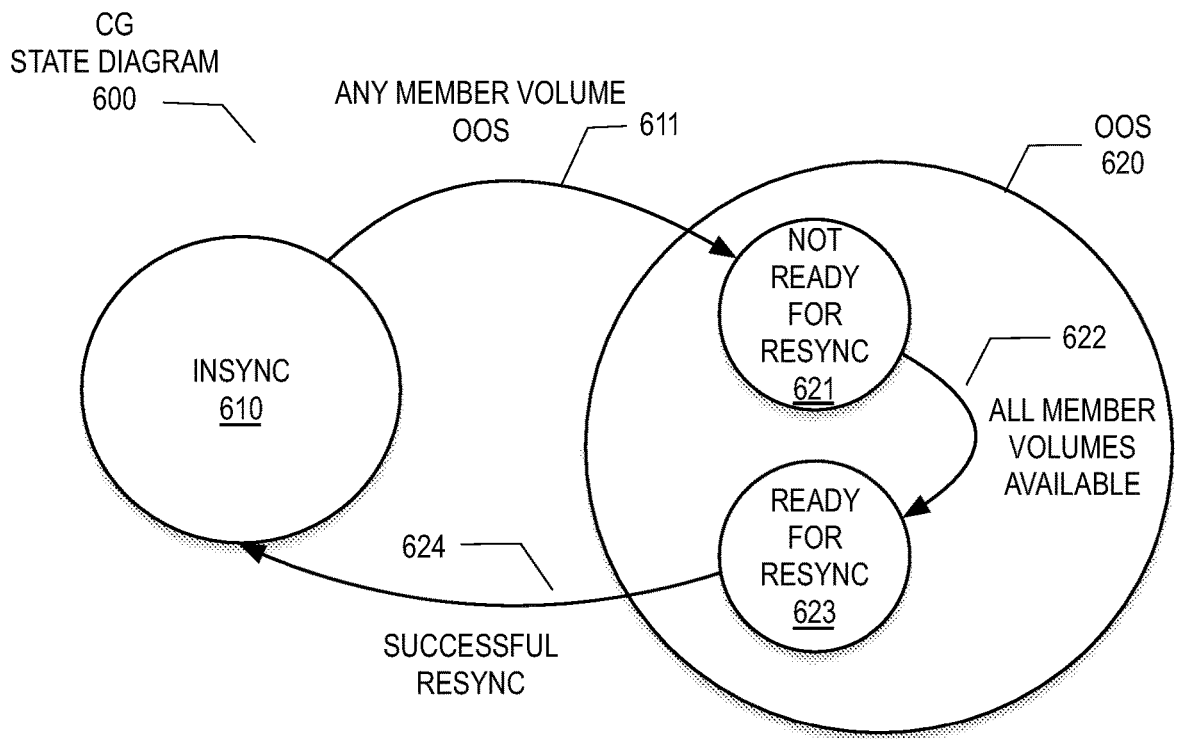
FIG. 6A is a CG state diagram in accordance with an embodiment of the present disclosure.
Figure 6B:
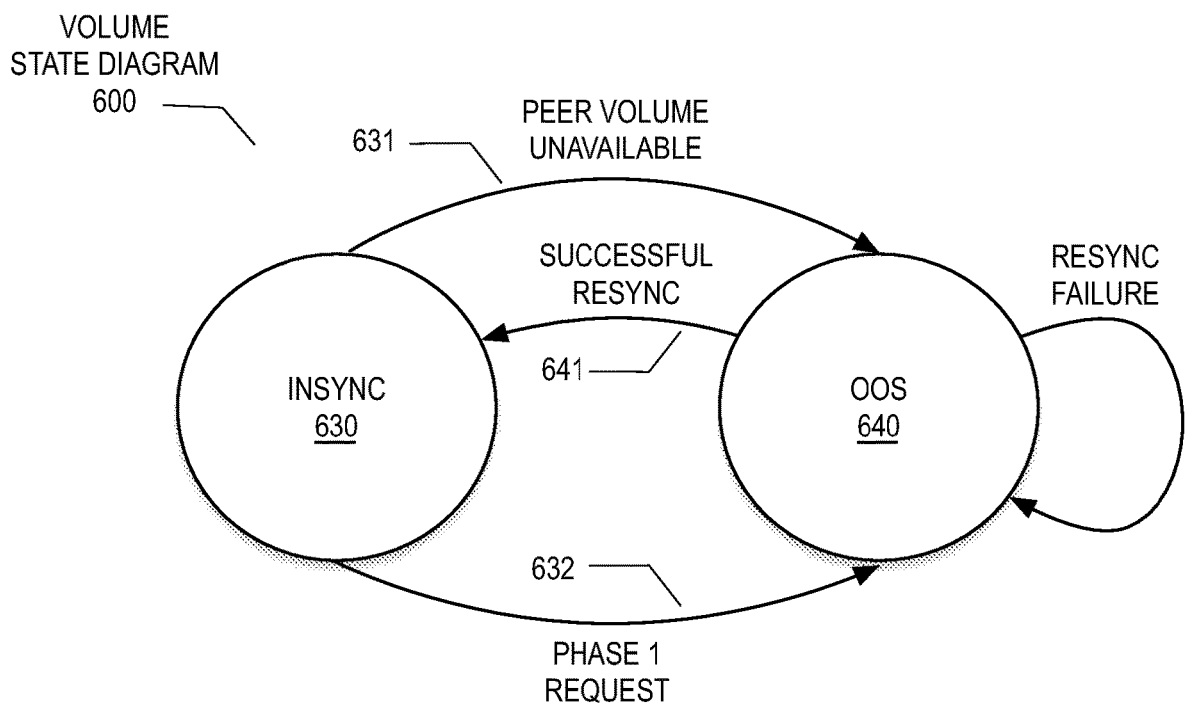
FIG. 6B is a volume state diagram in accordance with an embodiment of the present disclosure.

If Fast Resync experiences an error or failure resulting in the Fast Resync not being possible within a certain time period (e.g., 30-90 seconds, 60 seconds), then the following phases occur:

Phase 1: After expiration of the certain time period, node 311 will take a CG for node 311 out of sync (OOS). The state diagrams for the CG and a storage object (e.g., data container/volume) are illustrated in FIGS. 6A and 6B when Fast Resync has an error or failure.

Phase 2: add a strict sync policy to database software management that will disallow I/O for an extended time period or indefinite time period. Phase 1 behavior will be the default mode of operations if fast resync is not successfully performed within the certain time period.

The leader and follower roles for the clusters 310 and 320 help to avoid a split-brain situation with both of the clusters simultaneously attempting to serve I/O commands There are scenarios where both leader and follower copies can claim to be a leader copy. For example, a recovery post failover or failure during planned failover workflow can results in both clusters 310 and 320 attempting to serve I/O commands In one example, a follower cannot serve I/O until an AUFO happens. A leader doesn't serve I/O commands until the leader obtains a consensus.

The multi-site distributed storage system 300 presents a single virtual logical unit number (LUN) to a host computer or client using a synchronized-replicated distributed copies of a LUN. A LUN is a unique identifier for designating an individual or collection of physical or virtual storage devices that execute input/output (I/O) commands with a host computer, as defined by the Small System Computer Interface (SCSI) standard. In one example, active or passive access to this virtual LUN causes read and write commands to be serviced only by node 311 (leader) while operations received by the node 321 (follower) are proxied to node 311.

Example Storage Node

Figure 4:
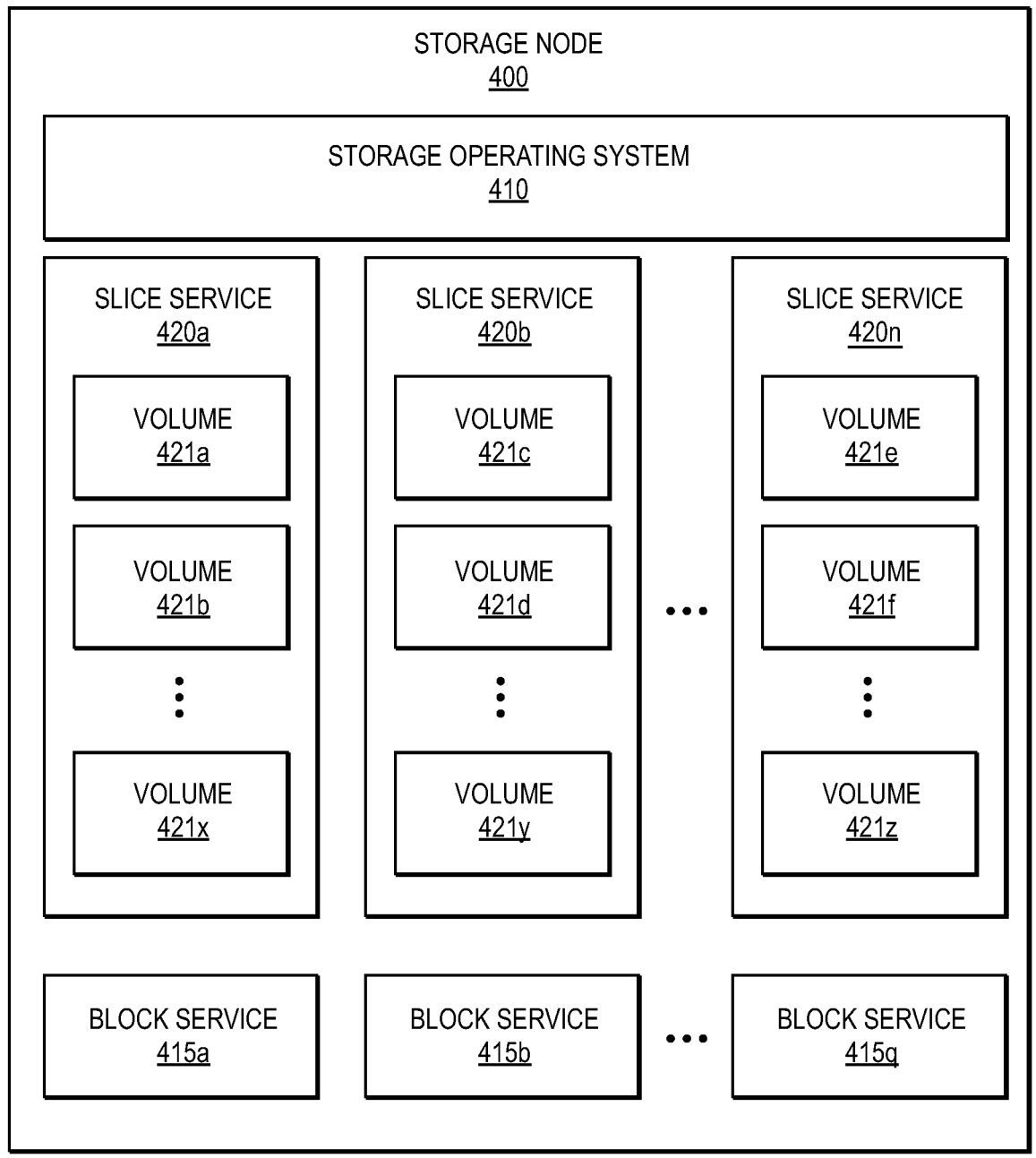
FIG. 4 is a block diagram illustrating a storage node in accordance with an embodiment of the present disclosure.

FIG. 4 is a block diagram illustrating a storage node 400 in accordance with an embodiment of the present disclosure. Storage node 400 represents a non-limiting example of storage nodes (e.g., 136a-n, 146a-n, 236a-n, 246a-n, 311, 312, 331, 322, 712, 715, 752, 754) described herein. In the context of the present example, storage node 400 includes a storage operating system 410, one or more slice services 420a-n, and one or more block services 415a-q. The storage operating system (OS) 410 may provide access to data stored by the storage node 400 via various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. A non-limiting example of the storage OS 410 is NetApp Element Software (e.g., the SolidFire Element OS) based on Linux and designed for SSDs and scale-out architecture with the ability to expand up to 100 storage nodes.

Each slice service 420 may include one or more volumes (e.g., volumes 421a-x, volumes 421c-y, and volumes 421e-z). Client systems (not shown) associated with an enterprise may store data to one or more volumes, retrieve data from one or more volumes, and/or modify data stored on one or more volumes.

The slice services 420a-n and/or the client system may break data into data blocks. Block services 415a-q and slice services 420a-n may maintain mappings between an address of the client system and the eventual physical location of the data block in respective storage media of the storage node 400. In one embodiment, volumes 421 include unique and uniformly random identifiers to facilitate even distribution of a volume's data throughout a cluster (e.g., cluster 135). The slice services 420a-n may store metadata that maps between client systems and block services 415. For example, slice services 420 may map between the client addressing used by the client systems (e.g., file names, object names, block numbers, etc. such as Logical Block Addresses (LBAs)) and block layer addressing (e.g., block IDs) used in block services 415. Further, block services 415 may map between the block layer addressing (e.g., block identifiers) and the physical location of the data block on one or more storage devices. The blocks may be organized within bins maintained by the block services 415 for storage on physical storage devices (e.g., SSDs).

As noted above, a bin may be derived from the block ID for storage of a corresponding data block by extracting a predefined number of bits from the block identifiers. In some embodiments, the bin may be divided into buckets or "sublists" by extending the predefined number of bits extracted from the block identifier. A bin identifier may be used to identify a bin within the system. The bin identifier may also be used to identify a particular block service 415a-q and associated storage device (e.g., SSD). A sublist identifier may identify a sublist with the bin, which may be used to facilitate network transfer (or syncing) of data among block services in the event of a failure or crash of the storage node 400. Accordingly, a client can access data using a client address, which is eventually translated into the corresponding unique identifiers that reference the client's data at the storage node 400.

For each volume 421 hosted by a slice service 420, a list of block IDs may be stored with one block ID for each logical block on the volume. Each volume may be replicated between one or more slice services 420 and/or storage nodes 400, and the slice services for each volume may be synchronized between each of the slice services hosting that volume. Accordingly, failover protection may be provided in case a slice service 420 fails, such that access to each volume may continue during the failure condition.

Consistency Groups

Figure 5:
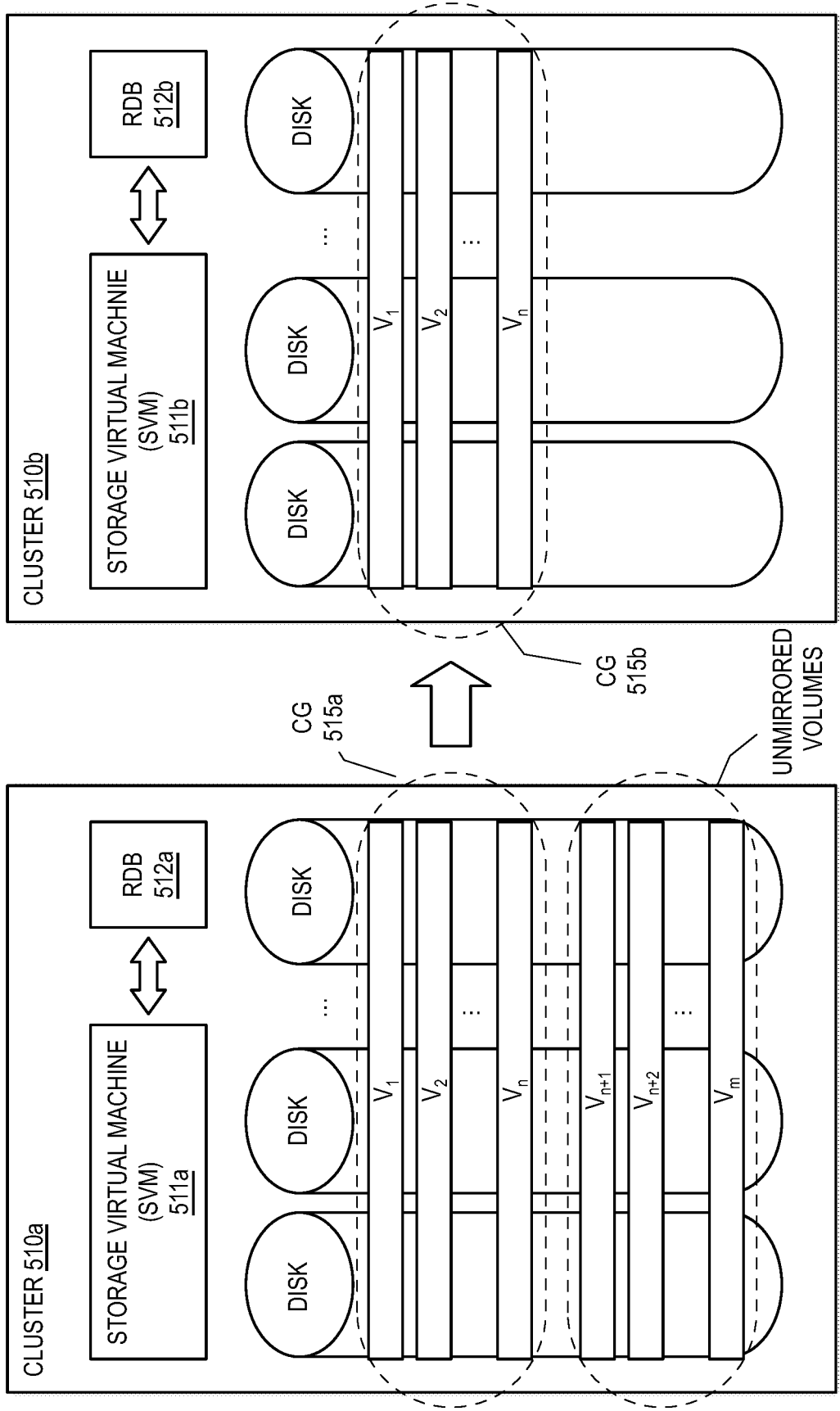
FIG. 5 is a block diagram illustrating the concept of a consistency group (CG) in accordance with an embodiment of the present disclosure.

FIG. 5 is a block diagram illustrating the concept of a consistency group (CG) in accordance with an embodiment of the present disclosure. In the context of the present example, a stretch cluster including two clusters (e.g., cluster 510a and 510b) is shown. The clusters may be part of a cross-site high-availability (HA) solution that supports zero recovery point objective (RPO) and zero recovery time objective (RTO) protections by, among other things, providing a mirror copy of a dataset at a remote location, which is typically in a different fault domain than the location at which the dataset is hosted. For example, cluster 510a may be operable within a first site (e.g., a local data center) and cluster 510b may be operable within a second site (e.g., a remote data center) so as to provide non-disruptive operations even if, for example, an entire data center becomes non-functional, by seamlessly failing over the storage access to the minor copy hosted in the other data center.

According to some embodiments, various operations (e.g., data replication, data migration, data protection, failover, and the like) may be performed at the level of granularity of a CG (e.g., CG 515a or CG 515b). A CG is a collection of storage objects or data containers (e.g., volumes) within a cluster that are managed by a Storage Virtual Machine (e.g., SVM 511a or SVM 511b) as a single unit. In various embodiments, the use of a CG as a unit of data replication guarantees a dependent write-order consistent view of the dataset and the minor copy to support zero RPO and zero RTO. CGs may also be configured for use in connection with taking simultaneous snapshot images of multiple volumes, for example, to provide crash-consistent copies of a dataset associated with the volumes at a particular point in time. The level of granularity of operations supported by a CG is useful for various types of applications. As a non-limiting example, consider an application, such as a database application, that makes use of multiple volumes, including maintaining logs on one volume and the database on another volume.

The volumes of a CG may span multiple disks (e.g., electromechanical disks and/or SSDs) of one or more storage nodes of the cluster. A CG may include a subset or all volumes of one or more storage nodes. In one example, a CG includes a subset of volumes of a first storage node and a subset of volumes of a second storage node. In another example, a CG includes a subset of volumes of a first storage node, a subset of volumes of a second storage node, and a subset of volumes of a third storage node. A CG may be referred to as a local CG or a remote CG depending upon the perspective of a particular cluster. For example, CG 515a may be referred to as a local CG from the perspective of cluster 510a and as a remote CG from the perspective of cluster 510b. Similarly, CG 515a may be referred to as a remote CG from the perspective of cluster 510b and as a local CG from the perspective of cluster 510b. At times, the volumes of a CG may be collectively referred to herein as members of the CG and may be individually referred to as a member of the CG. In one embodiment, members may be added or removed from a CG after it has been created.

A cluster may include one or more SVMs, each of which may contain data volumes and one or more logical interfaces (LIFs) (not shown) through which they serve data to clients. SVMs may be used to securely isolate the shared virtualized data storage of the storage nodes in the cluster, for example, to create isolated partitions within the cluster. In one embodiment, an LIF includes an Internet Protocol (IP) address and its associated characteristics. Each SVM may have a separate administrator authentication domain and can be managed independently via a management LIF to allow, among other things, definition and configuration of the associated CGs.

In the context of the present example, the SVMs make use of a configuration database (e.g., replicated database (RDB) 512a and 512b), which may store configuration information for their respective clusters. A configuration database provides cluster wide storage for storage nodes within a cluster. The configuration information may include relationship information specifying the status, direction of data replication, relationships, and/or roles of individual CGs, a set of CGs, members of the CGs, and/or the mediator. A pair of CGs may be said to be "peered" when one is protecting the other. For example, a CG (e.g., CG 515b) to which data is configured to be synchronously replicated may be referred to as being in the role of a destination CG, whereas the CG (e.g., CG 515a) being protected by the destination CG may be referred to as the source CG. Various events (e.g., transient or persistent network connectivity issues, availability/unavailability of the mediator, site failure, and the like) impacting the stretch cluster may result in the relationship information being updated at the cluster and/or the CG level to reflect changed status, relationships, and/or roles.

While in the context of various embodiments described herein, a volume of a CG may be described as performing certain actions (e.g., taking other members of a CG out of synchronization, disallowing/allowing access to the dataset or the minor copy, issuing consensus protocol requests, etc.), it is to be understood such references are shorthand for an SVM or other controlling entity, managing or containing the volume at issue, performing such actions on behalf of the volume.

While in the context of various examples described herein, data replication may be described as being performed in a synchronous manner between a paired set of CGs associated with different clusters (e.g., from a primary or leader cluster to a secondary or follower cluster), data replication may also be performed asynchronously and/or within the same cluster. Similarly, a single remote CG may protect multiple local CGs and/or multiple remote CGs may protect a single local CG. For example, a local CG can be setup for double protection by two remote CGs via fan-out or cascade topologies. In addition, those skilled in the art will appreciate a cross-site high-availability (HA) solution may include more than two clusters, in which a mirrored copy of a dataset of a primary (leader) cluster is stored on more than one secondary (follower) cluster.

FIG. 6A is a CG state diagram 600 in accordance with an embodiment of the present disclosure. In the context of the present example, the data replication status of a CG can generally be in either of an InSync state (e.g., InSync 610) or an OOS state (e.g., OOS 620). Within the OOS state, two sub-states are shown, a not ready for resync state 621 and a ready for resync state 623.

While a given CG is in the InSync state, the mirror copy of the primary dataset associated with the member volumes of the given CG may be said to be in-synchronization with the primary dataset and asynchronous data replication or synchronous data replication, as the case may be, are operating as expected. When a given CG is in the OOS state, the minor copy of the primary dataset associated with the member volumes of the given CG may be said to be out-of-synchronization with the primary dataset and asynchronous data replication or synchronous data replication, as the case may be, are unable to operate as expected. Information regarding the current state of the data replication status of a CG may be maintained in a configuration database (e.g., RDB 512a or 512b).

As noted above, in various embodiments described herein, the members (e.g., volumes) of a CG are managed as a single unit. In the context of the present example, the data replication status of a given CG is dependent upon the data replication status of the individual member volumes of the CG. A given CG may transition 611 from the InSync state to the not ready for resync state 621 of the OOS state responsive to any member volume of the CG becoming OOS with respect to a peer volume with which the member volume is peered. A given CG may transition 622 from the not ready for resync state 621 to the ready for resync state 623 responsive to all member volumes being available. In order to support recovery from, among other potential disruptive events, manual planned disruptive events (e.g., balancing of CG members across a cluster) a resynchronization process is provided to promptly bring the CG back into the InSync state from the OOS state. Responsive to a successful CG resync, a given CG may transition 624 from the ready for resync state 623 to the InSync state.

Although outside the scope of the present disclosure, for completeness it is noted that additional state transitions may exist. For example, in some embodiments, a given CG may transition from the ready for resync state 623 to the not ready for resync state 621 responsive to unavailability of a mediator (e.g., mediator 120) configured for the given CG. In such an embodiment, the transition 622 from the not ready for resync state 621 to the ready for resync state 623 should additionally be based on the communication status of the mediator being available.

FIG. 6B is a volume state diagram 650 in accordance with an embodiment of the present disclosure. In the context of the present example, the data replication status of a volume can be in either of an InSync state (e.g., InSync 630) or an OOS state (e.g., OOS 640). While a given volume of a local CG (e.g., CG 515a) is in the InSync state, the given volume may be said to be in-synchronization with a peer volume of a remote CG (e.g., CG 515b) and the given volume and the peer volume are able to communicate with each other via the potentially unreliable network (e.g., network 205), for example, through their respective LIFs. When a given volume of the local CG is in the OOS state, the given volume may be said to be out-of-synchronization with the peer volume of the remote CG and the given volume and the peer volume are unable to communicate with each other. According to one embodiment, a periodic health check task may continuously monitor the ability to communicate between a pair of peered volumes. Information regarding the current state of the data replication status of a volume may be maintained in a configuration database (e.g., RDB 512a or 512b).

A given volume may transition 631 from the InSync state to the OOS state responsive to a peer volume being unavailable. A given volume may transition 641 from the OOS state to the InSync state responsive to a successful resynchronization with the peer volume. As described below in further detail, in one embodiment, dependent write-order consistency of the mirror copy is preserved by responsive to any member volume of a given CG detecting it has gone OOS for any reason (e.g., a network failure), driving all member volumes OOS.

Fast Resynchronization

Figure 7:
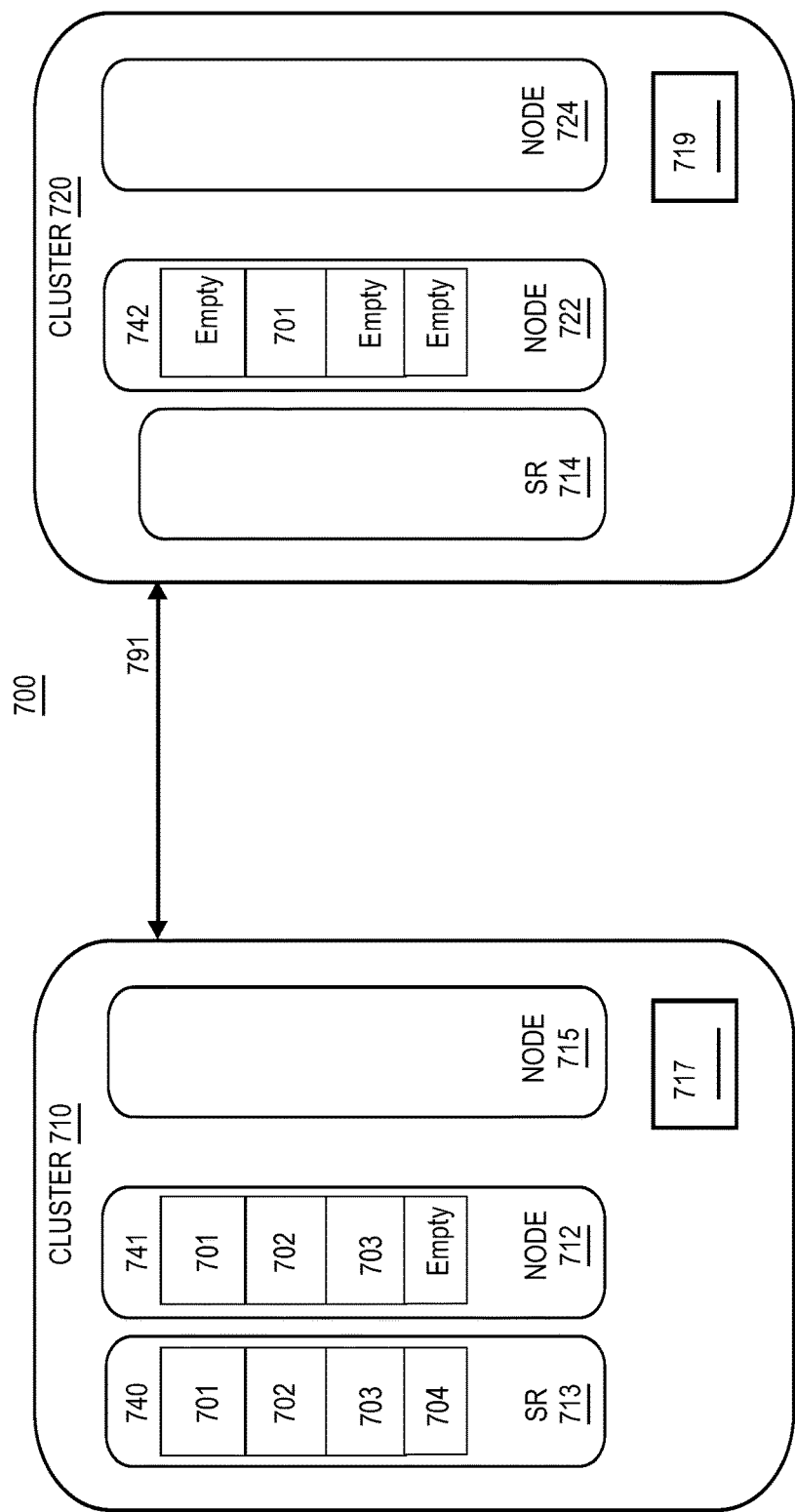
FIG. 7 is a block diagram illustrating a persistent inflight tracker that is implemented with operation (Op) logs in a distributed storage system in accordance with an embodiment of the present disclosure.

FIG. 7 is a block diagram illustrating a persistent inflight tracker that is implemented with operation (Op) logs in a distributed storage system in accordance with an embodiment of the present disclosure. In one embodiment, the distributed storage system 700 includes a primary storage cluster 710 with a primary copy of data in a consistency group (CG) that may include a subset or all volumes or data containers of a storage node. The consistency group can include volumes of nodes 712 and 715. Initially, this CG can be assigned a leader role. The secondary storage cluster 720 has a mirror copy of the data in a consistency group that may include volumes of nodes 722 and 724. This CG can be initially assigned a follower role.

Each storage cluster may include a configuration database (e.g., persistent replicated database (RDB) 717, 719, RDB 512a, RDB 512b), which is available on all storage nodes of a storage cluster. Each storage cluster includes synchronization replication circuitry (SR circuitry) 713 and 714 for synchronous replication between the storage clusters. The SR circuitry (SR) 714 includes a SR writer that receives replicated data operations to be executed on a replicated storage object (e.g., storage volume).

The operation logs or journals synchronize across a filesystem from a primary storage cluster 710 having a primary copy of data to a secondary storage cluster 720 having a minor copy of the data via communication link 791. In the event of an Out of Sync state for a volume due to a network glitch or a node crash, etc., a mechanism is designed to protect data for the volume and its mirror copy, avoid a coordinated OOS state for other volumes within the same CG as the OOS volume, and also avoid an OOS notification from nodes of the secondary storage cluster acting as a follower to an external mediator.

Embodiments of the present disclosure provide an Op log 741 (or Op log file 741) having Ops 701-703 on primary copy of node 712 and another Op log 742 having Op 701 on the secondary copy of node 722. Both of the copies will specify which operations are committed on each of the sides of the storage clusters. These two copies can be used to find how the filesystems for each storage cluster are differing and carry out resynchronization if necessary. Embodiments of the present disclosure eliminate design options that involve the synchronization replication circuitry (SR) components 713 and 714 directly accessing non-volatile memory contents.

In one example, persistent inflight tracking uses only In-Volume metafiles and has a minimal impact on the Op path length. A Write to metafile isn't logged in memory (e.g., non-volatile memory). Instead, a non-volatile log replay of the Op regenerates the entry in the metafile.

The SR circuitry 713 includes an active Ops log file 740 having Ops 701-704 and can be implemented with a circular array. For each Op, the SR circuitry 713 specifies its view of an Inflight Op range <Head, Tail> in a message payload. Even though responses come out of order, the SR circuitry 713 waits for a head Op to be completed and frees up all consecutive Ops which are responded to next.

The various nodes (e.g., storage nodes 136a-n and storage node 400) of the distributed storage systems described herein, and the processing described below with reference to the flow diagrams of FIGS. 8 and 10 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms, such as the computer system described with reference to FIG. 15 below.

Figure 8:
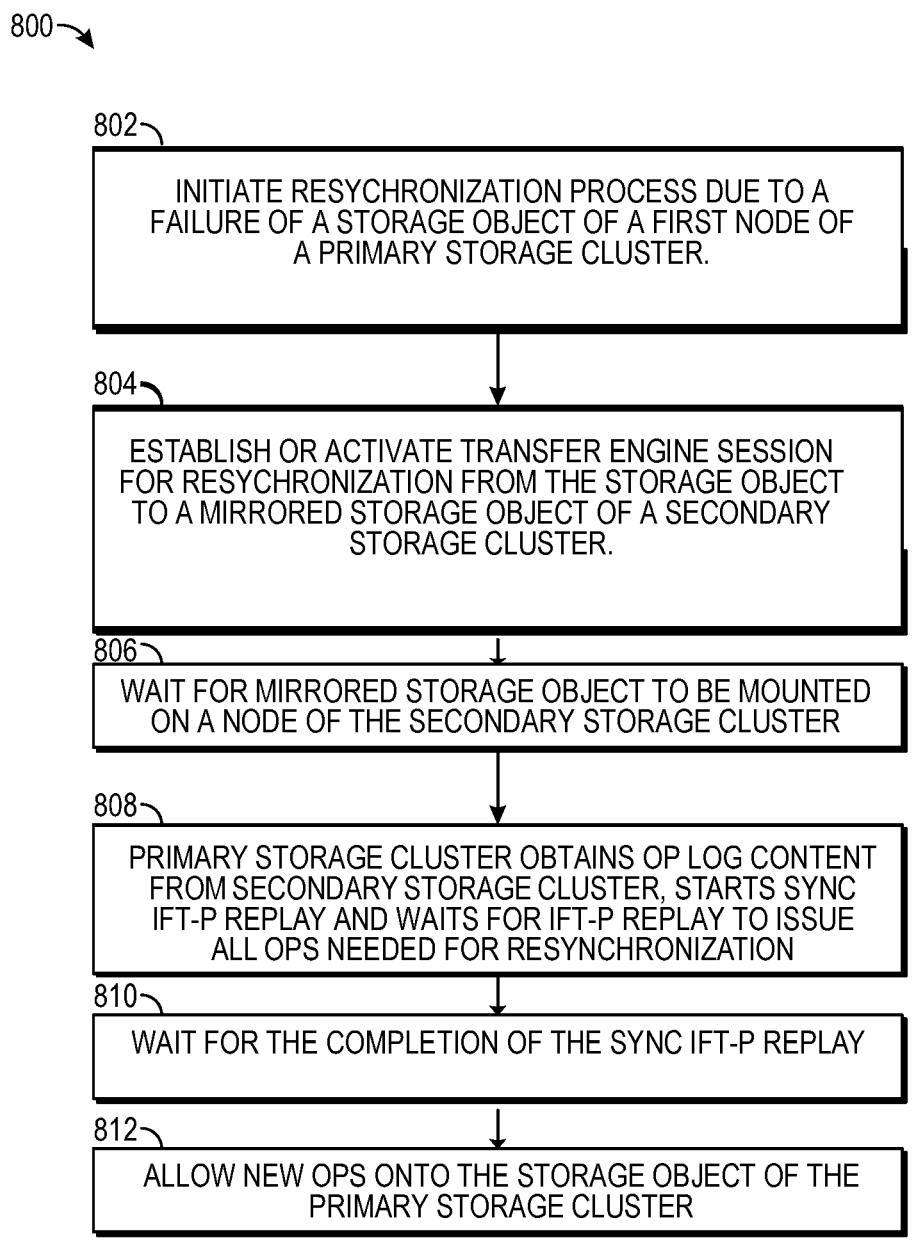
FIG. 8 is a flow diagram illustrating a set of operations for performing a synchronous persistent inflight tracking replay.

FIG. 8 is a flow diagram illustrating a set of operations for performing a synchronous persistent inflight tracking replay. In the context of the present example, it is assumed a peered pair of CGs, including a local CG (e.g., CG 515a) of a distributed storage system (e.g., cluster 510a) and a peered remote CG (e.g., CG 515b). One of the volumes of the local CG may have a failure and have an OOS state (e.g., OOS 620) for a period of time. Depending upon the nature of the data replication being performed (e.g., asynchronous or synchronous) and the particular implementation, a resynchronization may be performed responsive to any volume having OOS state.

State information regarding a data replication status of a mirror copy of a dataset associated with a local CG may be maintained, for example, to facilitate automatic triggering of resynchronization. For example, the state information may include information relating to the current availability or unavailability of a peer volume of a local CG.

At operation 802, computer implemented method 800 may initiate a resynchronization process due to a non-disruptive operation (NDO) event that handles a failure of a storage object of a first node of a primary storage cluster with the storage object becoming out of sync with a replicated or mirrored storage object of a secondary storage node. A second node of the primary cluster can remain in sync state and handle operations for the first node. At operation 804, the computer implemented method establishes or activates a transfer engine session for resynchronization from the storage object of the primary storage cluster to a mirrored storage object of a secondary storage cluster where a data copy of the storage object with a failure will be moved to a node of this mirrored storage object for the non-disruptive event. The storage object is temporarily not allowed to process I/O operations (e.g., user I/O operations) during this failure.

At operation 806, the computer implemented method waits for the mirrored storage object to be mounted on a storage node of the secondary storage cluster. As an example, when a new data storage device is added to a clustered network system, the operating system is informed where, in an existing directory tree, new files associated with the new data storage device are to be stored. This is often referred to as "mounting" a file system.

At operation 808, the primary storage cluster obtains content from an active Op log of a node of the secondary storage cluster, starts a persistent inflight tracker (IFT-P) replay of Ops, and waits for this replay to issue all Ops needed for resynchronization between the primary and secondary storage clusters. At operation 810, the primary storage cluster waits for completion of the IFT-P replay including waiting to receive responses from the secondary storage cluster. At operation 812, the storage object of the primary storage cluster is ready for user I/O Ops. The method allows new Ops to be handled and processed with the storage object of the primary storage cluster.

Figure 9:
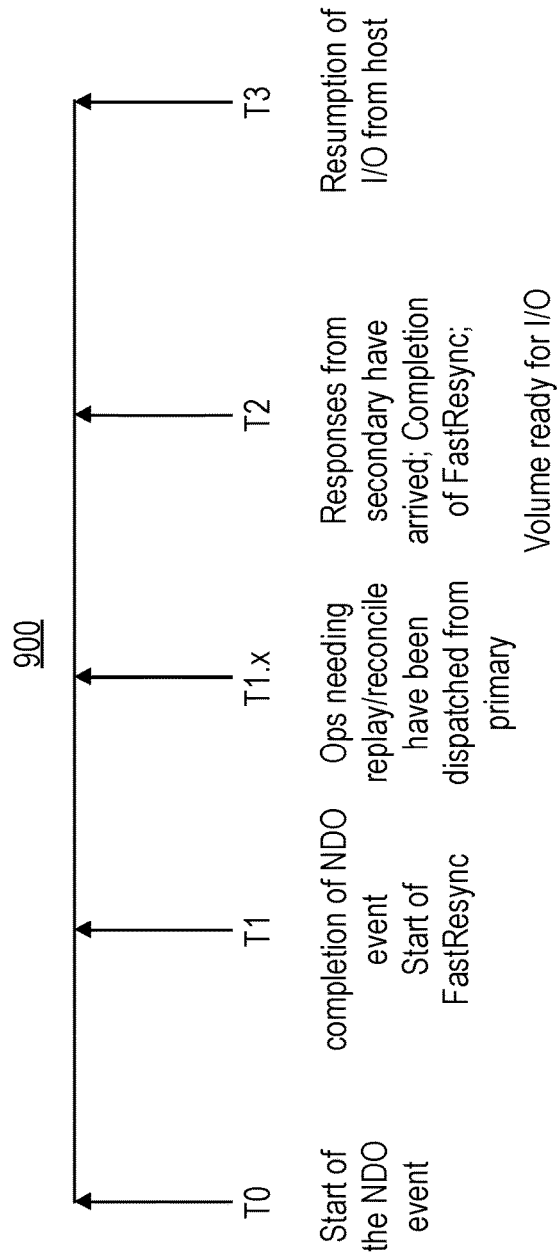
FIG. 9 illustrates a timeline 900 for a delay in processing user I/O Ops during synchronous inflight persistent replay.

FIG. 9 illustrates a timeline 900 for a delay in processing user I/O Ops during synchronous inflight persistent replay. The delay can be caused by a failure of a storage object or loss of connectivity for the storage object of a primary storage cluster. At time T0, a failure or loss of connectivity causes initiation of a non-disruptive operation (NDO) event to replace a failing storage object with a mirrored storage object to ensure data protection due to this failure or loss of connectivity. At time T1, the NDO event completes while out of sync state is detected for the storage object that is experiencing the failure or loss of connectivity. A fast resynchronization is initiated at time T1 between the storage object of the primary storage cluster and a mirrored storage object of a secondary storage cluster. At time T1.x, user I/O Ops that need to be replayed and reconciled between a first Op log of the primary storage cluster and a second Op log of the secondary storage cluster have been dispatched from the primary storage cluster (primary). At time T2, the primary storage cluster receives responses from the secondary storage cluster and the fast resynchronization between the storage object of the primary storage cluster and a mirrored storage object of a secondary storage cluster completes with the storage object (e.g., volume) of the primary storage cluster being ready for user I/O Ops. At time T3, the user I/O Ops resume on the storage object of the primary storage cluster. The user I/O Ops are paused or delayed until the NDO event and fast resynchronization including synchronous persistent inflight replay completes.

In one embodiment, the delay or pause in processing of user I/O Ops can be reduced with asynchronous persistent inflight tracking replay (IFT-P) between an Op log of a storage node of the primary storage cluster and an Op log of a storage node of the secondary storage cluster. In one example, the asynchronous persistent inflight tracking replay processes all pending I/O Ops in an increasing order of IFT-P sequence number. The Ops being replayed are subject to a dependent graph manager (DGM) check and an overlap write manager (OWM) check (or overlap range manager (ORM) check for checking if an incoming Op is modifying a first range of a storage object that overlaps a second range of the storage object to be modified by a pending Op). Once IFT-P replay has processed all Ops, the DGM and OWM at the primary storage cluster are fully ready with information of inflight Ops, information for any Ops completed at the secondary storage cluster, and Ops suspended at the primary storage cluster (e.g., Ops suspended due to waiting for dependencies between Ops to be satisfied). Therefore, user I/O can be allowed on the primary storage cluster just after asynchronous IFT-P processes all Ops without waiting for the IFT-P replay Ops to complete at the secondary storage cluster.

In one example, 100 Ops are stored in an Op log of a cache for a storage object to be reconciled with an Op log of a cache of a mirrored storage object. The asynchronous persistent inflight tracking replay determines that 80 Ops need to be replayed and this replay process populates data structures of the DGM and OWM at the primary storage cluster. The user I/O being allowed on the primary storage cluster just after IFT-P processes all Ops without waiting for the IFT-P replay Ops to complete at the secondary storage cluster can result in a tangible significant reduction in time delay for temporarily pausing the handling of the I/O Ops with the storage object of the primary storage cluster.

Figure 10:
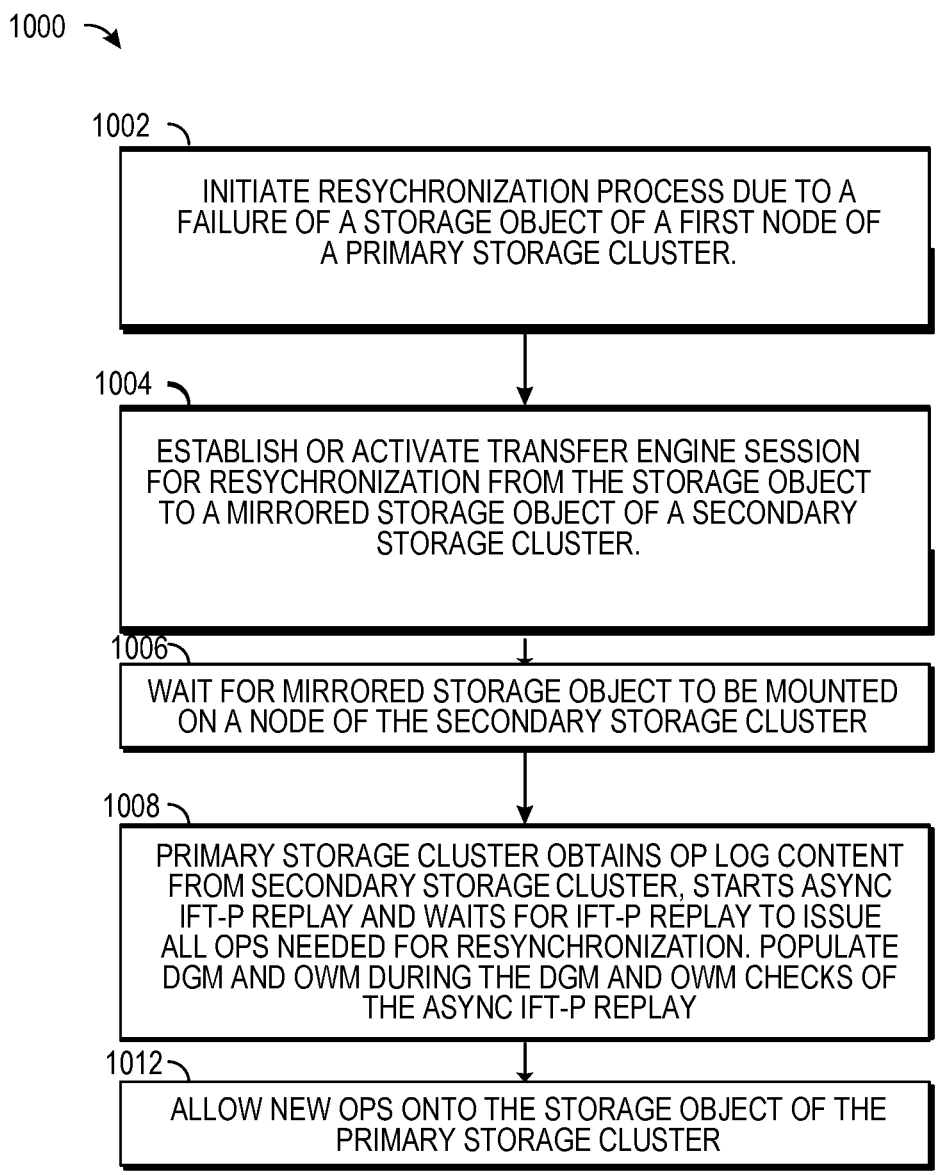
FIG. 10 is a flow diagram illustrating a set of operations for performing an asynchronous persistent inflight tracking replay in accordance with one embodiment.

FIG. 10 is a flow diagram illustrating a set of operations for performing an asynchronous persistent inflight tracking replay in accordance with one embodiment. In the context of the present example, it is assumed a peered pair of CGs, including a local CG (e.g., CG 515a) of a distributed storage system (e.g., cluster 510a) and a peered remote CG (e.g., CG 515b). One of the volumes of the local CG may have a failure and have an OOS state (e.g., OOS 620) for a period of time. Depending upon the nature of the data replication being performed (e.g., asynchronous or synchronous) and the particular implementation, a resynchronization may be performed responsive to any volume having OOS state.

State information regarding a data replication status of a mirror copy of a dataset associated with a local CG may be maintained, for example, to facilitate automatic triggering of resynchronization. For example, the state information may include information relating to the current availability or unavailability of a peer volume of a local CG.

At operation 1002, computer implemented method 1000 may initiate a resynchronization process due to a failure of a storage object of a first node of a primary storage cluster with the storage object becoming out of sync. A second node of the primary cluster can remain in sync state and handle operations for the first node. At operation 1004, the computer implemented method establishes or activates a transfer engine session for resynchronization from the storage object of the primary storage cluster to a mirrored storage object of a secondary storage cluster where a data copy of the storage object with a failure will be moved to a node of this mirrored storage object. The storage object is temporarily not allowed to process I/O operations (e.g., user I/O operations) during this failure. In one example, a connectivity loss or failure for the storage object of the first node causes an internal state of the first node to be out of sync (OOS) while maintaining an external state for any external entity as in sync in order to provide time for the transfer engine session to be established for reestablishing synchronous replication within duration of an Op timeout. In one example, the internal state for OOS does not cause the storage object to generate an out of sync (OOS) event for processing of a mediator or external entity. The internal state of OOS is with respect to the first node and the primary storage cluster while the external state is with respect to any external entities outside of the primary storage cluster. During this internal state with OOS, no user I/O operations are allowed on the storage object that is OOS. If the mediator or a controlling external entity views the storage object as being in sync, then the secondary storage cluster is capable of handling I/O operations for an application (e.g., database application) if the primary storage cluster fails during a resynchronization.

In a different solution, for asynchronous replication between the storage object and the mirrored storage object, the storage object will generate an external OOS event that is sent to a mediator or external entity for processing. For the OOS state, an automatic failover is disallowed.

At operation 1006, the computer implemented method waits for the mirrored storage object to be mounted on a storage node of the secondary storage cluster. At operation 1008, the primary storage cluster obtains content from an active Op log of the mirrored storage object of the secondary storage cluster, starts an asynchronous persistent inflight tracker (IFT-P) replay of Ops, and waits for this replay to issue all Ops needed for resynchronization between the storage object of the primary storage cluster and the mirrored storage object of the secondary storage cluster. Issuing all Ops for resynchronization causes these Ops to populate data structures of the DGM and OWM during the DGM and OWM checks. In one example, the replay (e.g., execution) of an OP is tracked (e.g., stored, queued) by a data structure of the DGM and also a data structure of the OWM. The Op is tracked to identify a set of objects that are modified by execution of the Op. The set of objects may include files and/or directory index nodes that are modified by the execution of the Op. In one example, the execution of a create object metadata Op is tracked to determine that the create object metadata Op modifies a parent directory object and a new object being created within the parent directory object by the create object metadata Op.

A set of identifiers of the set of objects are stored in association with each Op being replayed. The set of identifiers may comprise file identifiers, directory identifiers, and volume identifiers. In one example, the set of identifiers are stored in data structures of the DGM and OWM.

At operation 1012, the storage object of the primary storage cluster is ready for user I/O Ops. The method allows new Ops to be handled and processed with the storage object of the primary storage cluster without waiting for completion of the asynchronous IFT-P replay. The new Ops are handled and processed without waiting to receive responses from the secondary storage cluster.

Figure 11:
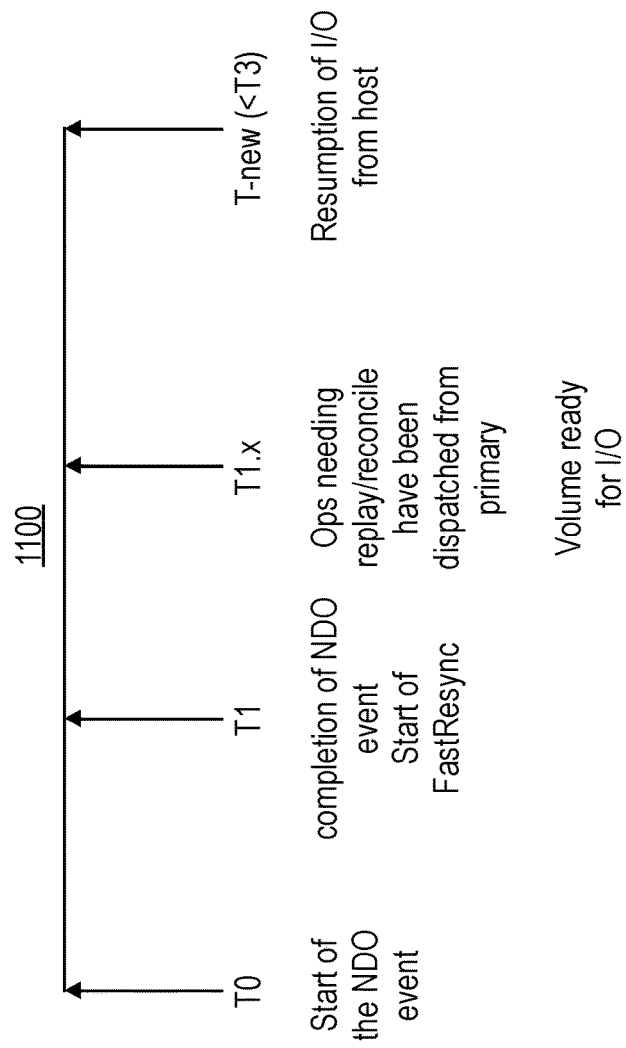
FIG. 11 illustrates a timeline 1100 for a reduced time delay in resumption of processing user I/O Ops based on using asynchronous inflight persistent replay.

FIG. 11 illustrates a timeline 1100 for a reduced time delay in resumption of processing user I/O Ops based on using asynchronous inflight persistent replay in accordance with one embodiment. The delay can be caused by a failure of a storage object or loss of connectivity for the storage object of a primary storage cluster or a secondary storage object. At time T0, a failure or loss of connectivity causes initiation of a non-disruptive operation (NDO) event to temporarily replace a failing storage object with a mirrored storage object to ensure data protection due to this failure or loss of connectivity. At time T1, the NDO event completes while out of sync state is detected for the storage object that is experiencing the failure or loss of connectivity. A fast resynchronization is initiated at time T1 between the storage object (e.g., volume, data container) of the primary storage cluster and a mirrored storage object (e.g., volume, data container) of a secondary storage cluster. At time T1.$x$, user I/O Ops that need to be replayed and reconciled between a first Op log for the storage object of the primary storage cluster and a second Op log for the mirrored storage object of the secondary storage cluster have been dispatched from the primary storage cluster and the storage object (e.g., volume, data container) of the primary storage cluster is ready for I/O Ops.

At time Tnew, which is less than T3 from timeline 900, the user I/O Ops resume on the storage object of the primary storage cluster without waiting for the asynchronous inflight persistent replay to complete. In one example, the user I/O Ops resume on the storage object of the primary storage cluster prior to completion of the asynchronous inflight persistent replay and prior to completion of fast resynchronization.

For the implementation of FIG. 9, by T2 either the fast resynchronization completes or the fast resynchronization is not complete, exceeds a time out period, and will be terminated to allow user I/O onto a volume. The fast resynchronization may exceed a time out period because a large number of Ops are stored in the Op log.

In one example, for the implementation of FIG. 11, a timer to provide the time out period is needed but a higher number of Ops in the Op log is not a reason to fire the timer. An Op time out may occur if a large number of incoming Ops are colliding with queued Ops in the OWM or DGM data structures.

Figure 12:
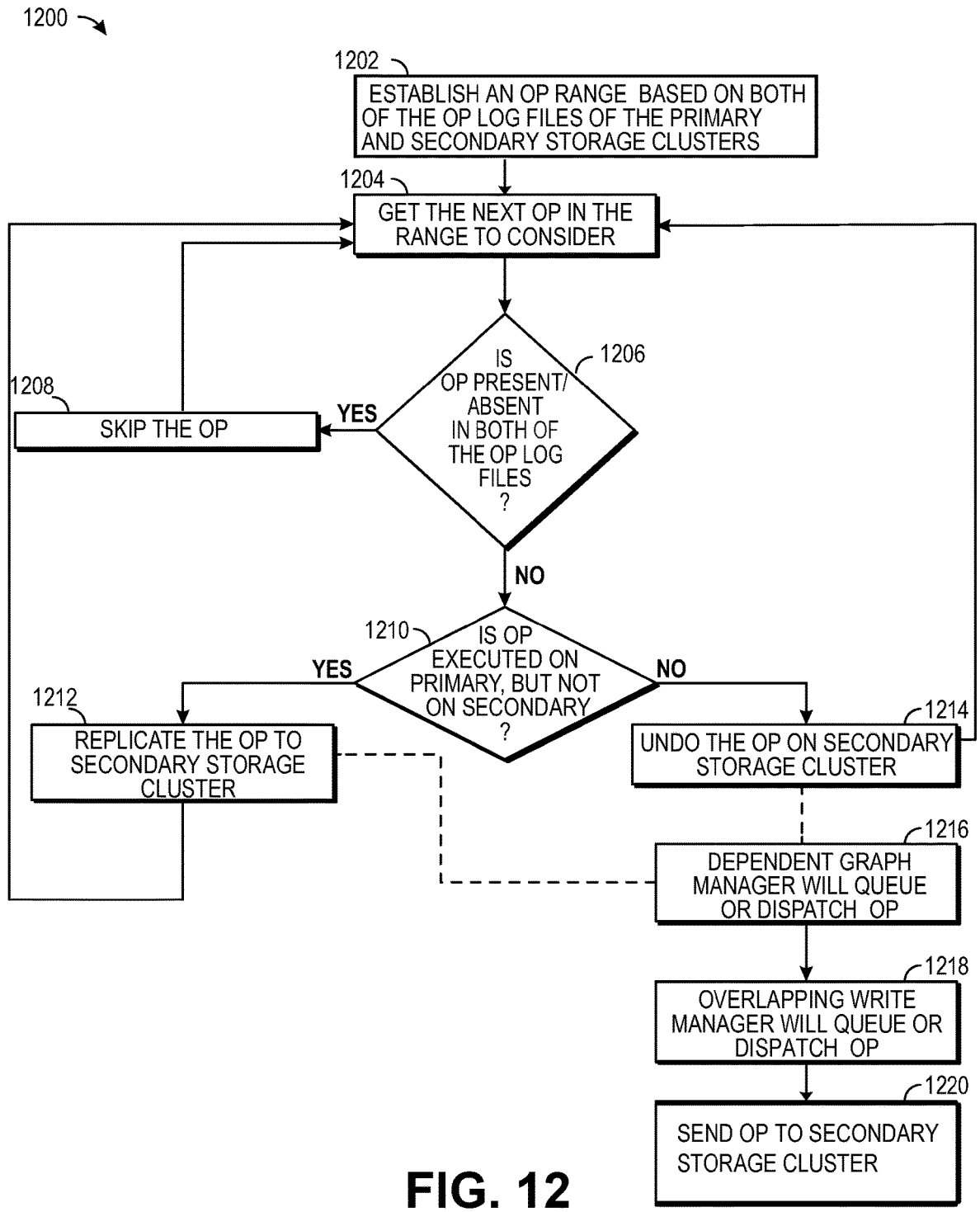
FIG. 12 is a flow diagram illustrating a set of operations for performing an asynchronous persistent inflight tracking replay and reconciliation in accordance with an embodiment of the present disclosure.

FIG. 12 is a flow diagram illustrating a set of operations for performing an asynchronous persistent inflight tracking replay and reconciliation in accordance with an embodiment of the present disclosure. The operations for the method 1200 represent a detailed explanation of the operation 1008 of FIG. 10. In the context of the present example, it is assumed a peered pair of CGs, including a local CG (e.g., CG 515$a$) of a distributed storage system (e.g., cluster 510$a$) and a peered remote CG (e.g., CG 515$b$). One of the storage objects (e.g., files, directories, file systems, data containers, volumes, storage virtual machine) of the local CG may have a failure and have an OOS state (e.g., OOS 620) for a period of time. Depending upon the nature of the data replication being performed (e.g., asynchronous or synchronous) and the particular implementation, a resynchronization may be performed responsive to any storage object having OOS state.

At operation 1202, the computer implemented method 1200 establishes an Op range based on both of the Op log files (or Op logs) from the primary and secondary storage clusters. A storage object of the primary storage cluster can be in synchronous data replication with a mirrored storage object of the secondary storage object when a failure or loss of connectively for the storage object occurs. A comparison between Op ranges of both of the Op log files from the storage object and mirrored storage object is performed to establish the Op range.

At operation 1204, the computer implemented method obtains a next Op in the established Op range to be considered. At operation 1206, the primary storage cluster determines whether the Op being considered is present or absent in both of the Op log files from the primary and second storage clusters. If the Op is present or absent in both of the Op log files from the primary and second storage clusters, then this Op is skipped at operation 1208 and the method returns to operation 1204 to consider a next Op.

If the Op is not present or absent in both of the Op log files, then the primary storage cluster determines if the Op is present (e.g., executed) on the primary storage cluster but not present on the secondary storage cluster at operation 1210. If so, then the primary storage cluster replicates the Op to the secondary storage cluster at operation 1212 and the method returns to operation 1204.

If not, then the Op is undone from the secondary storage cluster by reading from the primary storage cluster and updating the Op log of the secondary storage cluster and the method returns to operation 1204 to obtain a next Op.

Operations 1216, 1218, and 1220 may occur in connection with operations 1212 or 1214. As previously discussed in conjunction with the operations of FIG. 10, the user I/O Ops resume on the storage object of the primary storage cluster without waiting for the asynchronous inflight persistent replay to complete. The user I/O resumes as soon as the IFT-P replay is finished transferring a first pass of missing Ops through operations 1216 and 1218 to populate a DGM tracking data structure and a OWM tracking data structure, respectively.

Incoming Ops that have an overlap conflict with any inflight Op or Op of the OWM data structure will suspend temporarily while Ops that are independent of the inflight Op and the Ops of the OWM data structure can execute immediately and be sent to the secondary storage cluster at operation 1220. The dependent write order is maintained. Any Ops dependent on inflight Ops will not be issued since the inflight Ops were either not responded to or have been responded to with a failure.

At operation 1216, a dependent graph manager (DGM) will queue or dispatch an Op. If a metadata Op is currently inflight and waiting to be sent to the secondary storage cluster, then this metadata Op provides a volume level barrier for a volume to be modified by the metadata Op. A new incoming Op is queued in the DGM data structure if the new incoming Op modifies the same volume to be modified by the metadata Op. If there is no common volume, then the incoming Op proceeds to a second dependency check. If there is no inflight or waiting metadata Op, then the incoming Op proceeds to the second dependency check.

The second dependent check provides a file system object level barrier. The DGM allows parallel replication of Ops (e.g., data Ops, metadata Ops) if these Ops have no common affected file system object (e.g., file, index node, etc.). In this case, the Ops are dispatched to the OWM if no common to be modified file system object exists between new incoming Ops and queued Ops in the DGM data structure. Otherwise, the incoming Op is temporarily queued in the DGM data structure.

At operation 1218, the OWM receives incoming Ops that have been dispatched from the DGM. The OWM will dispatch the incoming Op to operation 1220 if no conflict for a common range (e.g., common byte range) of a common storage object that possibly exists between incoming Ops and inflight Ops listed in a data structure of the OWM. The OWM will queue the Op in the data structure of the OWM if a conflict exists for incoming Ops that will modify a same storage object and same range as the inflight or queued Ops. Then, in the conflict case, the OWM serializes the conflicting Ops from the OWM data structure to handle the conflict for file system objects among the queued Ops.

Conflicting Ops operate on a same object and are conflicting from a client point of view. In other words, an order of the operations will have a bearing on the client visible data or attributes. In one example, a truncate of a file and an expand of the file are conflicting Ops because depending on a sequence in which these Ops execute the resultant size of the file will vary.

At operation 1220, the incoming Op is sent to the secondary storage cluster.

In one example, incoming Ops include a create file handle d1/filename f1 Op and create file handle d2/filename f2. A storage object may not yet be available. However, if a file system of the primary storage cluster emits details of storage objects affected by the create Ops then a synchronous engine can detect independency versus dependency and suitably replicate the create Ops in parallel or sequentially. If the first and second create Ops have no common affected storage object, then the create Ops can be replicated independently to a destination (e.g., secondary storage cluster).

In another example, a first Op is executed by a file system of the primary storage cluster and sent to a destination. A second Op has a common storage object (e.g., index node) with the first Op. Thus, the second Op can not be replicated to destination yet due to common storage object (e.g., index node) with the inflight first Op. A third Op is a data Op that has no common storage object (e.g., index node) with first and second Ops. Thus, the third Op is dispatched to the destination without awaiting completion of the first and second Ops.

In one example, the asynchronous persistent inflight tracking replay will replay Ops in an increasing order of sequence number of an Op. Data Ops being replayed are subject to the dependent graph check and overlap write check. Once, the replay completes a first pass of Ops to be replayed from the first storage cluster to the second storage cluster, these Ops are tracked in the data structures of the OWM and DGM. Thus, the I/O operations can then be allowed on the primary storage cluster as soon as the first pass of Ops are tracked in the data structures of the OWM and DGM.

In one example, a tracking data structure of the DGM and/or OWM is queried using a set of identifiers of a set of objects that were modified by the initial execution of the incoming Op to determine whether the incoming Op is independent or dependent with respect to pending operations already dispatched to a destination file system (e.g., file system of primary storage cluster or secondary storage cluster) for execution (replay). The tracking data structure is used to track identifiers of objects that will be modified by operations dispatched, such as from the Op log or a replication queue, to the destination file system for replay (execution). If the set of identifiers do not match any identifiers within the tracking data structure, then the Op is independent of pending operations already dispatched to the destination file system, and thus will not modify objects being modified by the pending operations. Accordingly, the Op is dispatched to the destination file system for replay. In this way, the Op can be executed in parallel with the pending operations without having to wait for the pending operations to complete first. This significantly improves the speed of replay and utilization of resources by executing metadata operations in parallel with other operations. At the time of dispatching the metadata operation to the destination file system, the set of identifiers are populated into the tracking data structure to indicate that the set of objects will be modified by the metadata operation.

If at least one identifier within the set of identifiers matches at least one identifier within the tracking data structure, then the Op is dependent upon one or more pending operations already dispatched to the destination file system, and thus will modify at least one object that will be modified by the one or more pending operations. Accordingly, replay of the incoming Op is suspended. In one example, the Op may be requeued and evaluated later, such as after a threshold amount of time, to see if the Op can be replayed. In another example, the Op is serially dispatched to the destination file system for replay after the pending operations have been complete. In this way, the destination replicated or mirrored volume will be consistent with the source volume because objects are modified at the destination volume in the same order the objects were modified at the source volume.

Figure 13:
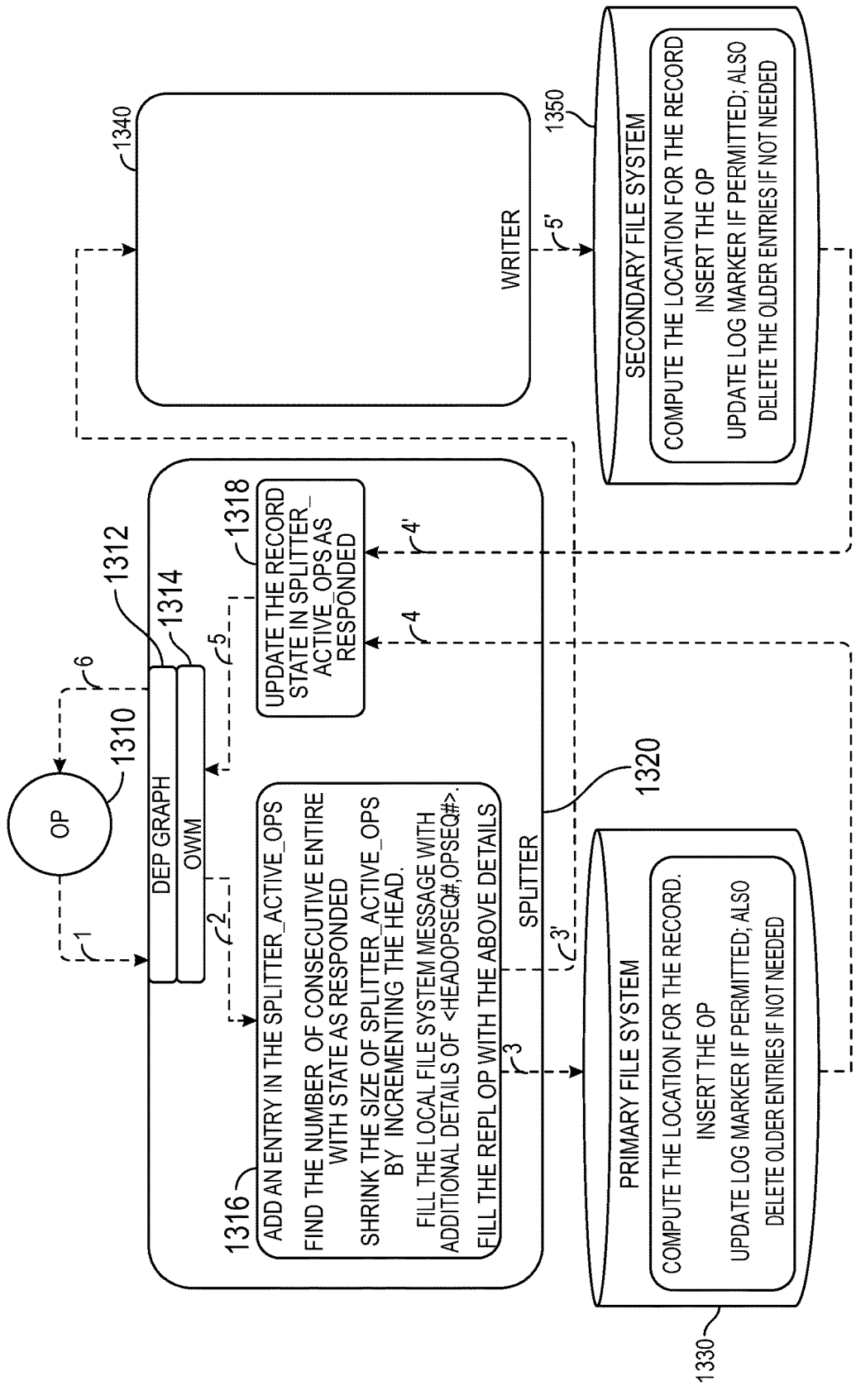
FIG. 13 illustrates a synchronous replication (SR) system with tracker updates for a transition or resynchronization process in accordance with one embodiment.

FIG. 13 illustrates a synchronous replication (SR) system with tracker updates for a transition or resynchronization process in accordance with one embodiment. The SR system 1300 includes a splitter component 1320 (or replicating circuitry 1322) and a primary file system 1330 that are located in a primary storage cluster while a writer 1340 and a secondary file system 1350 are located in a secondary storage cluster. At operation 2, an Op 1310 is queued in a queue 1316 of splitter component 1320 after being sent to a data structure of dependent graph manager at operation 1 and then passing (or failing) dependent check of dependent graph component 1312 and overlapping check of overlap write manager component 1314. The dependent graph component 1312 performs dependency check and includes a tracking data structure for tracking of Ops. The overlap writing manager component 1314 performs overlap conflict check and includes a tracking data structure for tracking of Ops.

An entry for the Op is added to the queue 1316. The splitter component 1320 will determine a number of consecutive entries with state as responded, shrink a size of splitter active Ops by incrementing a head, fill a local file system message with additional details of <Head Op Seq #, Op Seq #>, and fill a replicated Op with the above details. Next, the Op is sent to the file system 1330 at operation 3, and the file system 1330 computes a location for a record of the Op, inserts the Op, updates a log marker if permitted, and deletes any older entries in the Op log of the primary storage cluster if these entries are not needed.

Subsequently, at operation 4, the splitter component 1320 will update the record state 1318 in splitter active Ops as responded for the Op.

At operation 3' the replicated Op is sent to writer 1340 to be executed on a replicated storage object. The replicated Op is provided into a record of file system 1350, which also computes a location for a record of the replicated Op, inserts the replicated Op, updates a log marker if permitted, and deletes any older entries in the Op log if these entries are not needed. At operation 4', the splitter component 1320 will update the record state in splitter active Ops as responded for the replicated Op. Responses for operations 5 and 6 complete the transition or resynchronization process.

Figure 14:
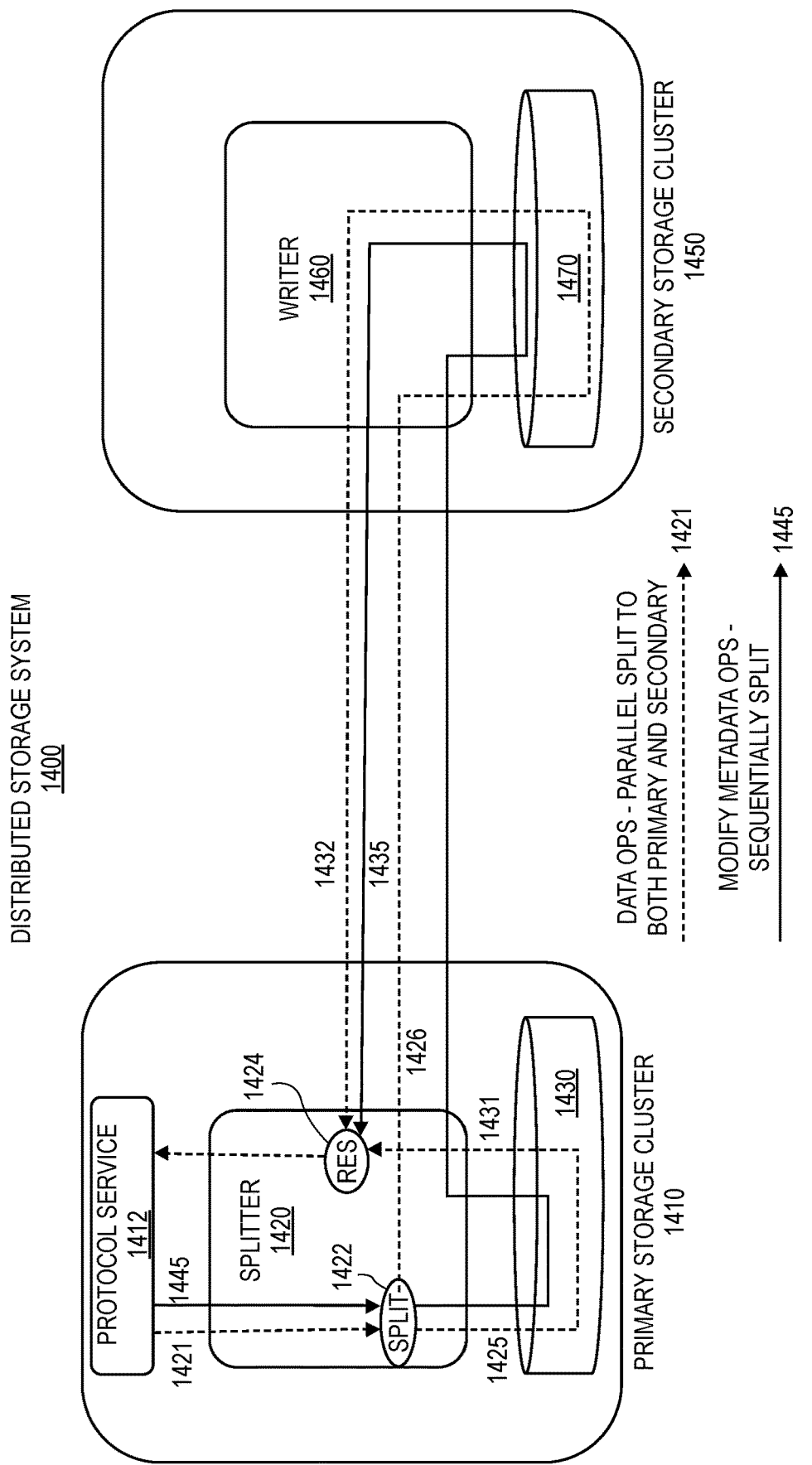
FIG. 14 illustrates parallel splitting of data Ops and sequentially splitting of modifying metadata Ops for a multi-site distributed storage system having synchronous replication (SR) between primary and secondary sites in accordance with one embodiment.

FIG. 14 illustrates parallel splitting of data Ops and sequentially splitting of modifying metadata Ops for a multi-site distributed storage system having synchronous replication (SR) between primary and secondary sites in accordance with one embodiment. The multi-site distributed storage system 1400 includes a splitter component 1420 (e.g., replication circuitry 1420) and a primary file system 1430 that are located in a primary storage cluster 1410 while a writer 1460 and a secondary file system 1470 are located in a secondary storage cluster 1450. The granularity of protection and failover is a consistency group, which is a plurality of volumes that together host application data.

Initially, operations are received and handled by a protocol service 1412 (e.g., network attached storage (NAS) protocol service, storage area network (SAN) protocol service, such as Small Computer System Interface (SCSI) or Fiber Channel Protocol (FCP), etc.) of the primary cluster and then the operations can be queued in a queue 1422 of splitter component 1420. The operations may represent a data operation (e.g., WRITE or PUNCH HOLE) or a metadata operation (e.g., CREATE, OPEN, RENAME, LINK, UNLINK, set attribute (SETATTR), etc.) to be executed on a file associated with a volume hosted by a node of a storage cluster (e.g., primary storage cluster 1410, secondary storage cluster 1450). In one embodiment, by convention, operations to be executed in relation to a particular member volume of a CG may be directed to the monarch node and performed by an SVM (e.g., SVM 511a or 511b).

An entry for the Op is added to the queue. The protocol service 1412 or splitter component 1420 will determine whether the Op is a data operation or a metadata operation to be executed on a file. If a data operation is being processed, then a parallel split process 1421 causes the data operation to be sent along paths 1425 and 1426 to the file systems 1430 and 1470, respectively, in parallel simultaneously. Next, the file system 1430 computes a location for a record of the data operation, inserts the data operation, updates a log marker if permitted, and deletes any older entries in the Op log of the primary storage cluster if these entries are not needed.

The splitter component 1420 will update the record state in splitter active Ops as responded for the data operation. The replicated data operation is sent to writer 1460 to be executed on a replicated storage object. The replicated data Op is provided into a record of file system 1470, which also computes a location for a record of the replicated Op, inserts the replicated Op, updates a log marker if permitted, and deletes any older entries in the Op log if these entries are not needed. Subsequently, the result processor 1424 will receive updates for the data operation along paths 1431 and 1432. The record state in splitter active Ops are updated as responded for the data operation. The result processor 1424 sends updates to the protocol service 1412.

If a metadata operation is being processed, then a sequential split process 1445 causes the metadata operation to be sent initially to the file system 1430 and then sequentially to the file system 1470. The splitter component 1420 will update the record state in splitter active Ops as responded for the data operation. The replicated data operation is sent to writer 1460 to be executed on a replicated storage object. Subsequently, the result processor 1424 will receive an update for the data operation along sequential path 1435. The record state in splitter active Ops are updated as responded for the data operation. The result processor 1424 sends updates to the protocol service 1412.

In another embodiment, a data Op can be subject to a parallel or sequential split. A metadata Op can be subject to a parallel or sequential split. For a parallel split, a data Op and metadata Op are each subject to multiple dependency graph checks. A data Op is additionally subject to OWM check.

For a sequential split, a data Op and metadata Op are each subject to multiple dependency graph checks. A data Op is additionally subject to OWM check.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 15:
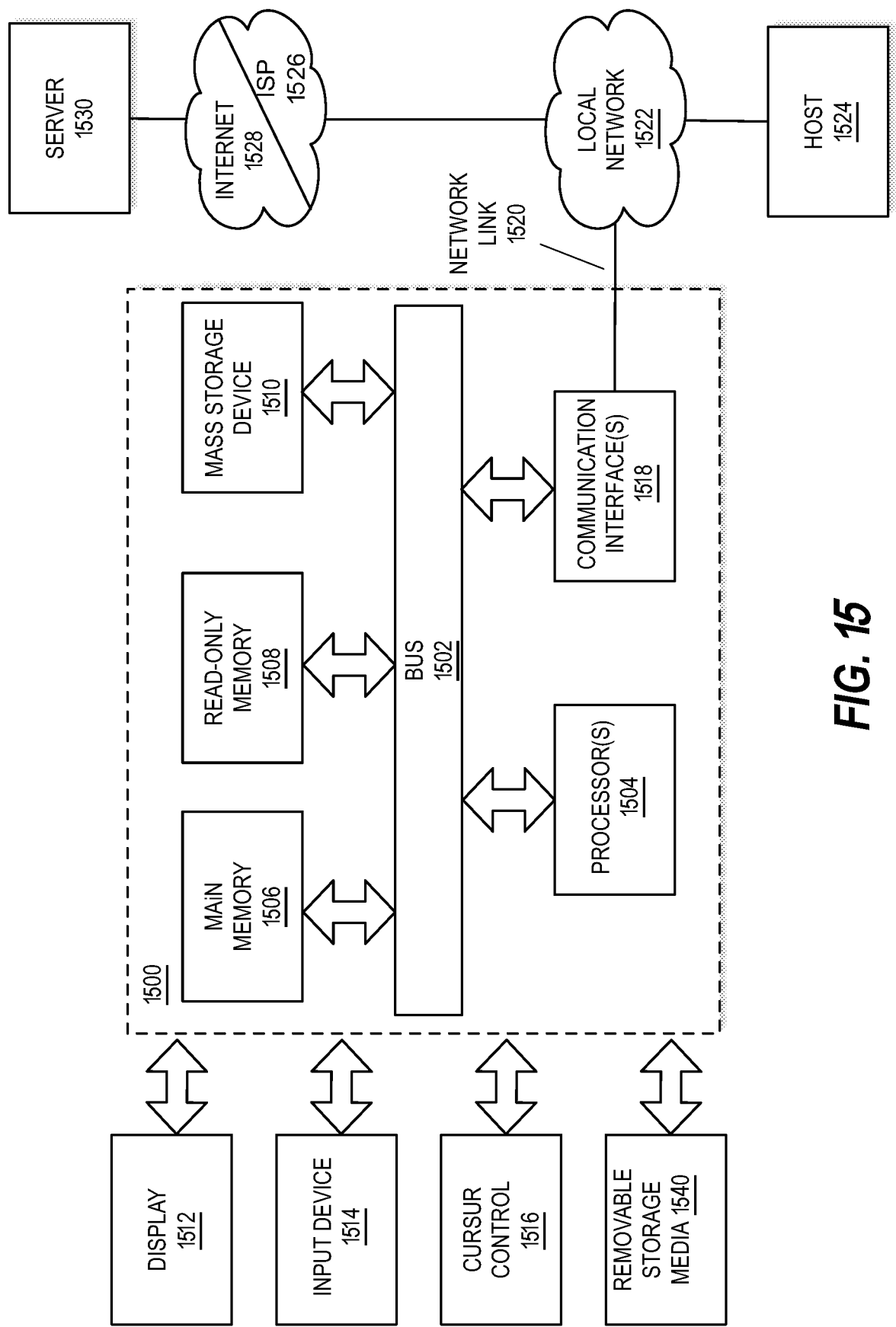
FIG. 15 illustrates an example computer system in which or with which embodiments of the present disclosure may be utilized.

FIG. 15 is a block diagram that illustrates a computer system 1500 in which or with which an embodiment of the present disclosure may be implemented. Computer system 1500 may be representative of all or a portion of the computing resources associated with a node (e.g., storage nodes 136a-n or storage nodes 146a-n) of a distributed storage system (e.g., cluster 235 or 245) or an administrative workstation (e.g., computer system 110 or 210). Notably, components of computer system 1500 described herein are meant only to exemplify various possibilities. In no way should example computer system 1500 limit the scope of the present disclosure. In the context of the present example, computer system 1500 includes a bus 1502 or other communication mechanism for communicating information, and a processing resource (e.g., a hardware processor 1504) coupled with bus 1502 for processing information. Hardware processor 1504 may be, for example, a general purpose microprocessor.

Computer system 1500 also includes a main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Such instructions, when stored in non-transitory storage media accessible to processor 1504, render computer system 1500 into a special-purpose machine that is customized to perform the operations specified in the instructions.

Computer system 1500 further includes a read only memory (ROM) 1508 or other static storage device coupled to bus 1502 for storing static information and instructions for processor 1504. A storage device 1510, e.g., a magnetic disk, optical disk or flash disk (made of flash memory chips), is provided and coupled to bus 1502 for storing information and instructions.

Computer system 1500 may be coupled via bus 1502 to a display 1512, e.g., a cathode ray tube (CRT), Liquid Crystal Display (LCD), Organic Light-Emitting Diode Display (OLED), Digital Light Processing Display (DLP) or the like, for displaying information to a computer user. An input device 1514, including alphanumeric and other keys, is coupled to bus 1502 for communicating information and command selections to processor 1504. Another type of user input device is cursor control 1516, such as a mouse, a trackball, a trackpad, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

Removable storage media 1540 can be any kind of external storage media, including, but not limited to, hard-drives, floppy drives, IOMEGA® Zip Drives, Compact Disc-Read Only Memory (CD-ROM), Compact Disc—Re-Writable (CD-RW), Digital Video Disk-Read Only Memory (DVD-ROM), USB flash drives and the like.

Computer system 1500 may implement the techniques described herein using customized hard-wired logic, one or more ASICs or FPGAs, firmware or program logic which in combination with the computer system causes or programs computer system 1500 to be a special-purpose machine. According to one embodiment, the techniques or methods described herein are performed by computer system 1500 in response to processor 1504 executing one or more sequences of one or more instructions contained in main memory 1506. Such instructions may be read into main memory 1506 from another storage medium, such as storage device 1510. Execution of the sequences of instructions contained in main memory 1506 causes processor 1504 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 1510. Volatile media includes dynamic memory, such as main memory 1506. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid state drive of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world wide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are example forms of transmission media.

Computer system 1500 can send messages and receive data, including program code, through the network(s), network link 1520 and communication interface 1118. In the Internet example, a server 1530 might transmit a requested code for an application program through Internet 1528, ISP 1526, local network 1522 and communication interface 1518. The received code may be executed by processor 1504 as it is received, or stored in storage device 1510, or other non-volatile storage for later execution.

Figure 16:
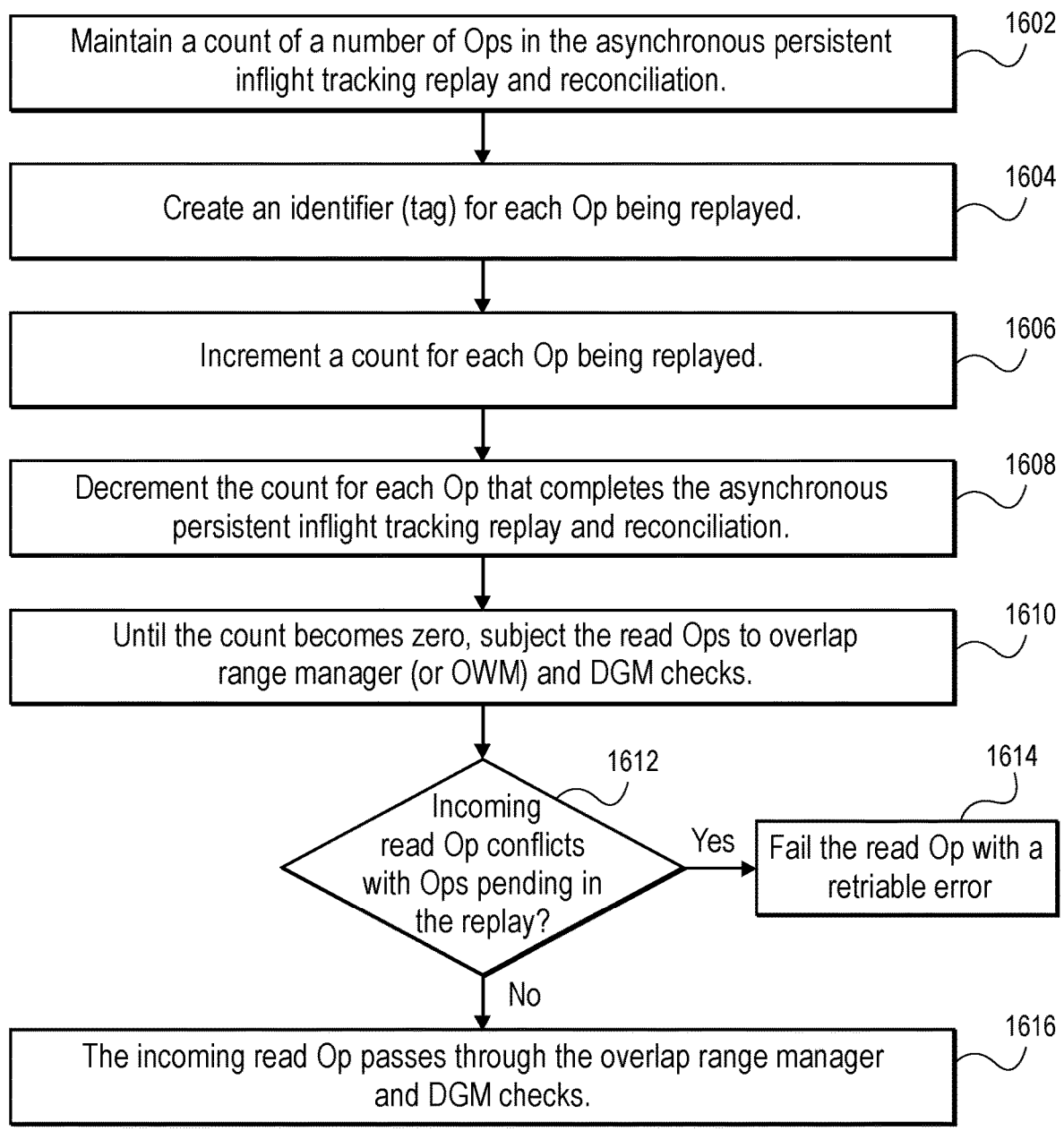
FIG. 16 is a flow diagram illustrating a set of operations for performing an asynchronous persistent inflight tracking replay and reconciliation in accordance with another embodiment of the present disclosure.

FIG. 16 is a flow diagram illustrating a set of operations for performing an asynchronous persistent inflight tracking replay and reconciliation in accordance with another embodiment of the present disclosure. In one embodiment, at operation 1602, a computer implemented method maintains a count of a number of Ops in the asynchronous persistent inflight tracking replay and reconciliation. At operation 1604, the computer implemented method creates an identifier (tag) for each Op being replayed. At operation 1606, the computer implemented method increments a count for each Op being replayed. At operation 1608, the computer implemented method decrements the count for each Op that completes the asynchronous persistent inflight tracking replay and reconciliation. At operation 1610, until the count becomes zero, subject the read Ops to overlap range manager (or OWM) and DGM checks. At operation 1612, the computer implemented method determines if an incoming read Op is conflicting with Ops pending in the asynchronous persistent inflight tracking replay. If so, then fail the read Op with a retriable error at operation 1614. If no conflict, then the incoming read Op passes through the overlap range manager (or OWM) and DGM checks at operation 1616.

What is claimed is:

1. A computer implemented method performed by one or more processing resources of a storage node, the method comprising:

temporarily disallowing input/output (I/O) operations for a storage object of the storage node of a primary storage cluster when the storage object of the primary storage cluster has a connection loss or failure;

initiating a resynchronization between the storage object and a replicated storage object of a secondary storage cluster based on the connection loss or failure with the resynchronization including initiating asynchronous inflight tracking and replay for reconciliation of any missing I/O operations that are missing from one of a first Op log of the primary storage cluster and a second Op log of the secondary storage cluster and performing a dependency check to determine any dependencies between Ops for any I/O operations being replayed from the primary storage cluster; and allowing new I/O operations to be handled with the storage object of the primary storage cluster just after asynchronous inflight tracking and replay processes pendings Ops at the primary storage cluster without waiting for completion of the asynchronous inflight tracking and replay including receiving responses from the secondary storage cluster.

2. The computer implemented method of claim 1, further comprising:

performing the dependency check with a dependent graph manager at a volume level barrier for any missing I/O operations that are issued during the asynchronous inflight tracking and replay; and populating a tracking data structure of the dependent graph manager during the dependency check.

3. The computer implemented method of claim 1, further comprising:

performing the dependency check with a dependent graph manager at a file system object barrier level for any missing I/O operations that are issued during the asynchronous inflight tracking and replay; and populating a tracking data structure of the dependent graph manager during the dependency check.

4. The computer implemented method of claim 3, wherein the tracking data structure of the dependent graph manager is configured to track in flight Ops, Ops completed at the secondary storage cluster, and Ops waiting for dependencies to be satisfied.

5. The computer implemented method of claim 1, further comprising:

performing an overlap conflict check of any storage object to be modified by any missing I/O operations and also be modified by an inflight Op with an overlap write manager; and populating a tracking data structure of the overlap write manager during the overlap conflict check.

6. The computer implemented method of claim 5, wherein the tracking data structure of the overlap write manager is configured to track in flight Ops, Ops completed at the secondary storage cluster, and Ops waiting for dependencies to be satisfied.

7. The computer implemented method of claim 1, wherein the new I/O operations are allowed to be handled with the storage object of the primary storage cluster without waiting for replay Ops to complete at the secondary storage cluster.

8. A non-transitory computer-readable storage medium embodying a set of instructions, which when executed by a processing resource of a storage node cause the processing resource to:

temporarily disallow input/output (I/O) operations for a storage object of the storage node of a primary storage cluster when the storage object of the primary storage cluster has a connection loss or failure;

initiating a resynchronization between the storage object and a replicated storage object of a secondary storage cluster based on the connection loss or failure with the resynchronization including initiating asynchronous inflight tracking and replay for reconciliation of any missing I/O operations that are missing from one of a first Op log of the primary storage cluster and a second Op log of the secondary storage cluster and performing a dependency check to determine any dependencies between Ops for any I/O operations being replayed from the primary storage cluster; and allowing new I/O operations to be handled with the storage object of the primary storage cluster just after asynchronous inflight tracking and replay processes pendings Ops at the primary storage cluster without waiting for completion of the asynchronous inflight tracking and replay including receiving responses from the secondary storage cluster.

9. The non-transitory computer-readable storage medium of claim 8, wherein the instructions when executed by the processing resource cause the processing resource to:

perform the dependency check with a dependent graph manager at a volume level barrier for any missing I/O operations that are issued during the asynchronous inflight tracking and replay; and populate a tracking data structure of the dependent graph manager during the dependency check.

10. The non-transitory computer-readable storage medium of claim 8, wherein the instructions when executed by the processing resource cause the processing resource to:

perform the dependency check with a dependent graph manager at a file system object barrier level for any missing I/O operations that are issued during the asynchronous inflight tracking and replay; and populate a tracking data structure of the dependent graph manager during the dependency check.

11. The non-transitory computer-readable storage medium of claim 10, wherein the tracking data structure of the dependent graph manager is configured to track in flight Ops, Ops completed at the secondary storage cluster, and Ops waiting for dependencies to be satisfied.

12. The non-transitory computer-readable storage medium of claim 8, wherein the instructions when executed by the processing resource cause the processing resource to:

perform an overlap conflict check of any storage object to be modified by any missing I/O operations and also to be modified by an inflight Op with an overlap write manager; and populate a tracking data structure of the overlap write manager during the overlap conflict check.

13. The non-transitory computer-readable storage medium of claim 12, wherein the tracking data structure of the overlap write manager is configured to track in flight Ops, Ops completed at the secondary storage cluster, and Ops waiting for dependencies to be satisfied.

14. The non-transitory computer-readable storage medium of claim 8, wherein the new I/O operations are allowed to be handled with the storage object of the primary storage cluster without waiting for replay Ops to complete at the secondary storage cluster.

15. A storage node of a primary storage cluster, comprising:

a processing resource; and a non-transitory computer-readable medium coupled to the processing resource, having stored therein instructions, which when executed by the processing resource cause the processing resource to:

temporarily disallow input/output (I/O) operations for a storage object of the storage node of a primary storage cluster when the storage object of the primary storage cluster has a connection loss or failure;

initiate a resynchronization between the storage object and a replicated storage object of a secondary storage cluster based on the connection loss or failure with the resynchronization including initiating asynchronous inflight tracking and replay for reconciliation of any missing I/O operations that are missing from one of a first Op log of the primary storage cluster and a second Op log of the secondary storage cluster;

perform a dependency check to determine any dependencies between Ops for any I/O operations being replayed from the primary storage cluster; and allow new I/O operations to be handled with the storage object of the primary storage cluster just after asynchronous inflight tracking and replay processes pendings Ops at the primary storage cluster without waiting for completion of the asynchronous inflight tracking and replay including receiving responses from the secondary storage cluster.

16. The storage node of claim 15, wherein the instructions when executed by the processing resource cause the processing resource to:

perform the dependency check with a dependent graph manager at a volume level barrier for any missing I/O operations that are issued during the persistent inflight tracking replay; and populate a tracking data structure of the dependent graph manager during the dependency check.

17. The storage node of claim 15, wherein the instructions when executed by the processing resource cause the processing resource to:

perform the dependency check with a dependent graph manager at a file system object barrier level for any missing I/O operations that are issued during the asynchronous inflight tracking and replay; and populate a tracking data structure of the dependent graph manager during the dependency check, wherein the tracking data structure of the dependent graph manager is configured to track in flight Ops, Ops completed at the secondary storage cluster, and Ops waiting for dependencies to be satisfied.

18. The storage node of claim 15, wherein the instructions when executed by the processing resource cause the processing resource to:
perform an overlap conflict check of any storage object to be modified by any missing I/O operations and inflight Ops with an overlap write manager for any missing I/O operations that are issued during the asynchronous inflight tracking and replay; and
populate a tracking data structure of the overlap write manager during the overlap conflict check, wherein the tracking data structure of the overlap write manager is configured to track in flight Ops, Ops completed at the secondary storage cluster, and Ops waiting for dependencies to be satisfied.

19. The storage node of claim 15, wherein the new I/O operations are allowed to be handled with the storage object of the primary storage cluster without waiting for replay Ops to complete at the secondary storage cluster.

20. The storage node of claim 15, wherein the instructions when executed by the processing resource cause the processing resource to:
maintain a count of a number of Ops in the asynchronous inflight tracking replay;
create an identifier for each Op being replayed;
increment a count for each Op being replayed;
decrement the count for each Op that completes the asynchronous inflight tracking and replay;
until the count becomes zero, subject read Ops to overlap range manager and dependent graph manager checks; and
determine if an incoming read Op is conflicting with Ops pending in the asynchronous inflight tracking and replay.

* * * * *